(12) United States Patent
Katakura

(10) Patent No.: US 7,339,749 B2
(45) Date of Patent: Mar. 4, 2008

(54) ZOOM LENS AND IMAGING SYSTEM INCORPORATING IT

(75) Inventor: Masahiro Katakura, Nagano (JP)

(73) Assignee: Olympus Corporation and Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/328,348

(22) Filed: Jan. 10, 2006

(65) Prior Publication Data

US 2006/0176575 A1 Aug. 10, 2006

(30) Foreign Application Priority Data

Feb. 8, 2005 (JP) ............................. 2005-031560
Feb. 21, 2005 (JP) ............................. 2005-044303

(51) Int. Cl.
*G02B 15/14* (2006.01)
(52) U.S. Cl. ...................................... 359/689; 359/683
(58) Field of Classification Search ................ 359/689, 359/683
See application file for complete search history.

(56) References Cited

U.S. PATENT DOCUMENTS

| | | | | |
|---|---|---|---|---|
| 4,572,620 A * | 2/1986 | Kikuchi | ...................... | 359/688 |
| 2002/0044362 A1 | 4/2002 | Watanabe et al. | | |
| 2003/0099043 A1 | 5/2003 | Takeuchi et al. | | |
| 2003/0123156 A1 | 7/2003 | Minefuji | | |
| 2003/0197949 A1 | 10/2003 | Eguchi | | |
| 2004/0080632 A1* | 4/2004 | Iwasawa et al. | ......... | 348/240.3 |

FOREIGN PATENT DOCUMENTS

JP 2004-061675 2/2004

* cited by examiner

*Primary Examiner*—Ricky Mack
*Assistant Examiner*—William C Choi
(74) *Attorney, Agent, or Firm*—Kenyon & Kenyon LLP

(57) ABSTRACT

The invention concerns a zoom lens that has a zoom ratio of the order of 3, and is of sufficiently compact size and improved optical properties. The zoom lens comprises, in order from its object side, a first lens unit having negative refracting power, a second lens unit having positive refracting power and a third lens unit having positive refracting power, wherein the space between adjacent lens units is varied for zooming. The first lens unit consists of, in order from its object side, one positive lens and one negative lens, and the second lens unit consists of, in order from its object side, two positive lenses and one negative lens. The third lens unit consists of one positive lens, and satisfies the following condition.

$$0.5 < (R_1 - R_2)/(R_1 + R_2) < 0.95$$

Here $R_1$ and $R_2$ are the axial radii of curvature of the object- and image-side surfaces of the positive lens in the third lens unit, respectively.

20 Claims, 18 Drawing Sheets

——— 486.13nm  --------- 656.27nm  ——— 587.56nm

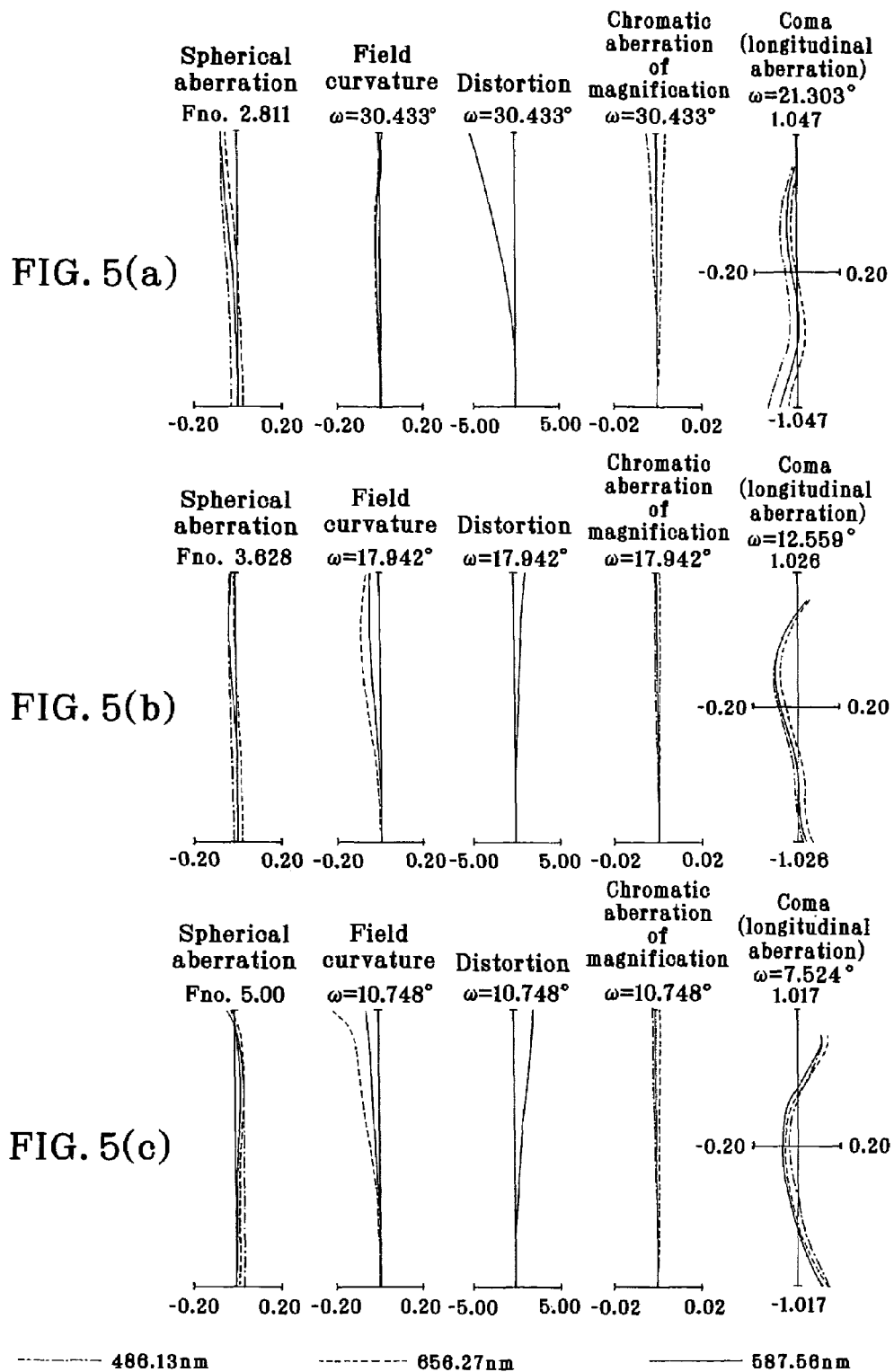

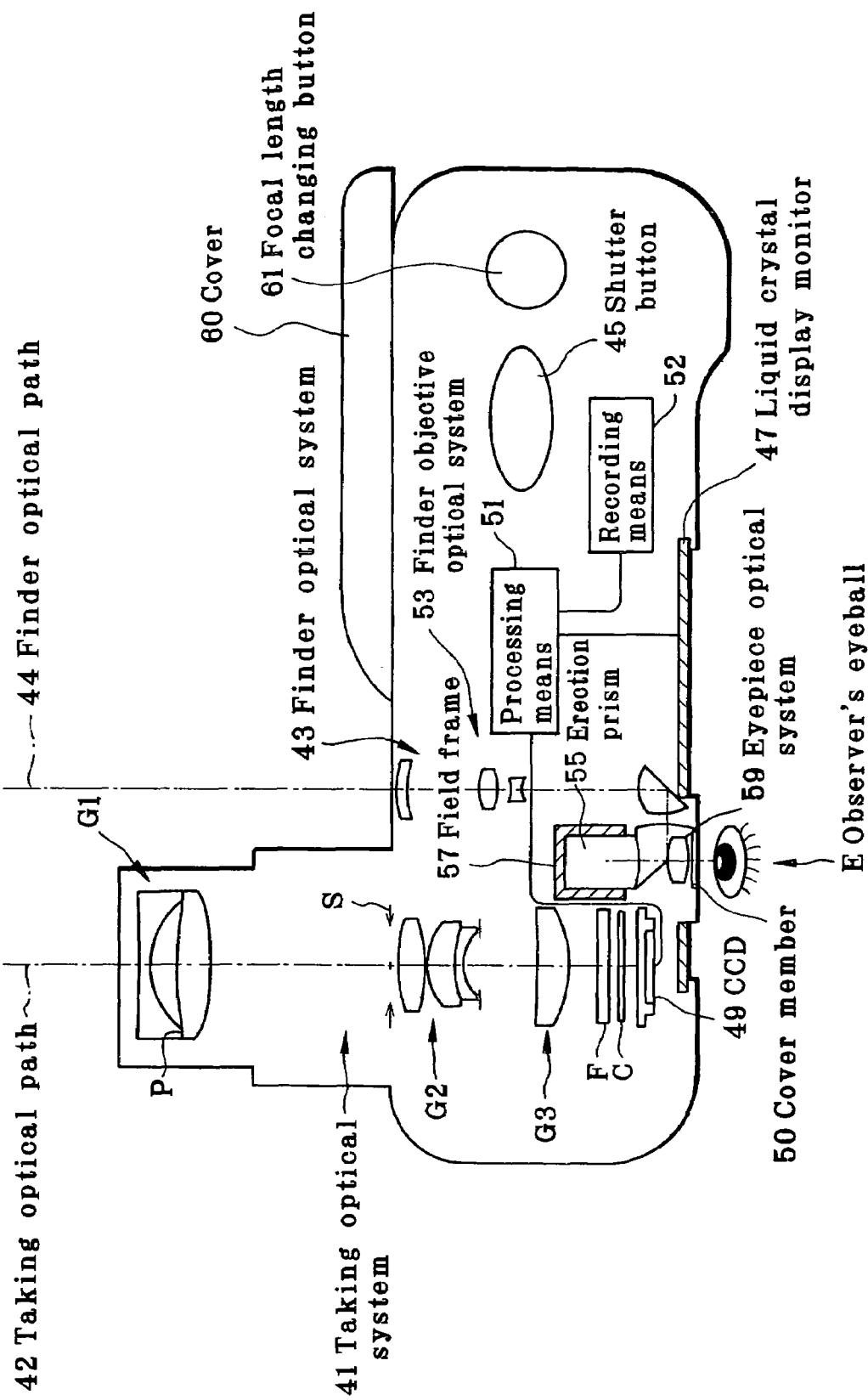

ZOOM LENS AND IMAGING SYSTEM INCORPORATING IT

This application claims benefit of Japanese Application No. 2005-31560 filed in Japan on Feb. 8, 2005 and No. 2005-44303 filed in Japan on Feb. 21, 2005, the contents of which are incorporated by this reference.

BACKGROUND OF THE INVENTION

The present invention relates generally to a zoom lens and an imaging system incorporating it, and more particularly to a three units type zoom lens comprises a solid-state imaging device suitable for compact digital cameras and an imaging system that incorporates it.

In recent years, digital cameras and video cameras using solid-stage imaging devices have seen wide use. Such digital cameras and video cameras are now required to have more compact and more multifunctional arrangements. To meet such demands, zoom lenses having much higher image-formation capabilities are in need. In addition, those digital cameras and video cameras are still left much to be desired in fabrication cost while keeping high image quality intact.

For zoom lenses suitable for use with solid-state imaging devices, for instance, the following three patent publications are now available.

Patent Publication 1
JP(A) 2001-318311
Patent Publication 2
JP (A) 2004-61675
Patent Publication 3
JP(A)2003-140041

Patent publication 1 comes up with a three units type zoom lens comprising, in order from its object side, a first lens unit of negative refracting power, a second lens unit of positive refracting power and a third lens unit of positive refracting power, wherein for zooming purposes, the first lens unit and the second lens unit are operable to move from the wide-angle end toward the telephoto end.

Patent publication 2 proposes a three units type zoom lens system comprising, in order from its object side, a first lens unit of negative refracting power, a second lens unit of positive refracting power and a third lens unit of positive refracting power, wherein upon zooming from the wide-angle end to the telephoto end, each lens unit is operable to move.

Patent publication 3 puts forward another three units type zoom lens comprising, in order from its object side, a first lens unit of negative refracting power, a second lens unit of positive refracting power and a third lens unit of positive refracting power, wherein for zooming purposes, the first lens unit and the second lens unit are operable to move from the wide-angle end toward the telephoto end. This zoom lens system is rather improved in that, albeit having a zoom ratio of about 3, it is composed of as small as five subunits or six lenses and has an aperture ratio of at least 1:2.8 at the wide-angle end.

However, a problem with the zoom optical system of patent publication 1 is that it is composed of a bit more lenses or seven lenses, ending up with higher fabrication costs.

Although the zoom lens set forth in patent publication 2 is smaller in the number of lenses, and more improved in optical performance, than that disclosed in patent publication 1, yet the whole length of the lens system from the vertex of the lens surface nearest to the object side to the imaging plane of a solid-state imaging device is relatively long and an axial lens-to-lens space is comparably wide, offering a problem that the whole thickness of a lens barrel upon received at a collapsible lens mount grows large.

The optical system set forth in patent publication 3 is still less than satisfactory in terms of compactness upon housed in place, because the thickness of each lens is large, and moreover its whole length is long relative to its focal length.

SUMMARY OF THE INVENTION

In view of such problems with the prior art as mentioned above, the first object of the invention is to provide a zoom lens that has suitable zoom ratios, sufficiently compact size, a reduced or limited number of lenses, and improved optical properties. The second object of the invention is to provide a zoom lens that is less vulnerable to fabrication errors with the result that cost reductions are achievable, and that has sufficiently compact size and improved optical properties.

According to the first aspect of the invention, these objects are accomplished by the provision of a zoom lens comprising, in order from an object side thereof, a first lens unit having negative refracting power, a second lens unit having positive refracting power and a third lens unit having positive refracting power with a space between adjacent lens units varied for zooming, characterized in that:

the first lens unit consists of, in order from an object side thereof, one negative lens and one positive lens, the second lens unit consists of, in order form an object side thereof, two positive lenses and one negative lens, and the third lens unit consists of one positive lens and satisfies the following condition:

$$0.5 < (R_1 - R_2)/(R_1 + R_2) < 0.95 \quad (1)$$

where $R_1$ is an axial radius of curvature of an object-side surface of the positive lens in the third lens unit, and $R_2$ is an axial radius of curvature of an image-side surface of the positive lens in the third lens unit.

Preferably, the zoom lens according to the first aspect of the invention is characterized in that the first lens unit consists of, in order from an object side thereof, a negative meniscus lens convex on an object side thereof and a positive lens; the second lens unit consists of, in order of an object side thereof, one positive lens and a cemented doublet consisting of a double-convex lens and a double-concave lens; and the third lens unit consists of one positive meniscus lens.

Preferably, the zoom lens according to the first aspect of the invention is characterized in that an image-side surface of the negative meniscus lens located in the first lens unit and convex on the object side, and an image-side surface of the positive meniscus lens in the third lens unit are each an aspheric surface.

Preferably, the zoom lens according to the first aspect of the invention is characterized by satisfying the following condition (2):

$$|(R_3 + R_4)/(R_3 - R_4)| < 0.1 \quad (2)$$

where $R_3$ is an axial radius of curvature of an object-side surface of the double-convex lens in the cemented doublet in the second lens unit, and $R_4$ is an axial radius of curvature of an image-side surface of the double-convex lens in the cemented doublet in the second lens unit.

Preferably, the zoom lens according to the first aspect of the invention is characterized in that the absolute values of curvatures of both surfaces of the double-convex lens in the cemented doublet in the second lens unit are equal.

Preferably, the zoom lens according to the first aspect of the invention is characterized in that the positive lens in the third lens unit is formed of a plastic lens.

Preferably, the zoom lens according to the first aspect of the invention is characterized by satisfying the following condition (3):

$$D_2/D_1 < 1.5 \quad (3)$$

where $D_1$ is an axial thickness of the lens located in, and nearest to the object side of, the first lens unit, and $D_2$ is an axial air separation between the first lens and the second lens in the first lens unit.

Preferably, the zoom lens according to the first aspect of the invention is characterized in that both surfaces of the positive lens located in, and nearest to the object side of, the second lens unit are aspheric surfaces.

Preferably, the zoom lens according to the first aspect of the invention is characterized in that on an object side of the positive lens located in, and nearest to the object side of, the second lens unit, there is a stop that moves in unison with the second lens unit.

Preferably, the zoom lens according to the first aspect of the invention is characterized in that on an object side further off a lens component located in, and nearest to the object side of, the second lens unit, there is a stop that moves in unison with the second lens unit.

The first zoom lens according to the second aspect of the invention comprises, in order from an object side thereof, a first lens unit having negative refracting power, a second lens unit having positive refracting power and a third lens unit having positive refracting power with a space between adjacent lens units varied for zooming, characterized in that:

the first lens unit consists of two lenses including a negative lens and a positive lens, the second lens unit consists of two positive lenses and one negative lens, and the third lens unit consists of one positive lens, with satisfaction of the following conditions:

$$n_1 > 1.8 \quad (4\text{-}1)$$

$$n_2 > 1.8 \quad (4\text{-}2)$$

where $n_1$ is a refractive index of the negative lens in the first lens unit, and $n_2$ is a refractive index of the positive lens in the first lens unit.

The advantage of, and the requirement for, the above first zoom lens arrangement according to the second aspect of the invention is now explained.

The three units type having a negative-positive-positive refracting power profile, wherein each lens unit is arranged as mentioned above, works favorably for a slimmed-down zoom lens that has a zoom ratio of the order of 3 with satisfactory telecentric capability kept intact.

As the first lens unit is composed of two lenses, negative and positive, it allows for easy size reductions and easy correction of aberrations.

As the second lens group that is likely to have strong refracting power is composed of three lenses, i.e., two positive lenses and one negative lens, it allows for easy size reductions and easy correction of aberrations.

To make the zoom lens compact while ensuring a suitable zoom ratio, it is favorable to use one positive lens in the third lens group, because getting hold of telecentric capability and correction of aberrations are easily achievable.

Conditions (4-1) and (4-2) are the requirements for holding back aberrations and achieving size reductions while the refracting power of the first lens unit is ensured.

The first lens unit receives off-axis light rays over wide angles of view at the wide-angle end. In view of correction of aberrations, it is thus preferable to configure each of the negative and positive lenses in a meniscus shape tightly convex on its object side. However, such a shape often results in an increase in the thickness of the first lens unit.

Therefore, if two lenses forming the first lens unit are permitted to have refractive indices high enough to satisfy conditions (4-1) and (4-2) at the same time, it is then possible to slim down the first lens unit.

Being short of the lower limit of 1.8 to conditions (4-1) and (4-2) works against compactness, because large curvature must then be imparted to the lenses to obtain sufficient power.

The upper limit to conditions (4-1) and (4-2) should preferably be set at 2.3 (<2.3), because lens materials exceeding that upper value cost much.

The second zoom lens according to the second aspect of the invention is characterized in that in the first zoom lens, the first lens unit consists of, in order from an object side thereof, a negative lens convex on an image plane side thereof and a positive lens convex on an object side thereof, and satisfies the following condition.

$$0.3 < |f_{1G}/R_1 + f_{1G}/R_3 + f_{1G}/R_4| < 1.9 \quad (A)$$

Here, $f_{1G}$ is a focal length of the first lens group, $R_1$ is an absolute value of the paraxial radius of curvature of the object-side surface of the negative lens in the first lens group, $R_3$ is an absolute value of the paraxial radius of curvature of the object-side surface of the positive lens in the first lens group, and $R_4$ is an absolute value of the paraxial radius of curvature of the image-side surface of the positive lens in the first lens group.

The advantage of, and the requirement for, the above second zoom lens arrangement according to the second aspect of the invention is now explained.

As the first lens unit is composed of, in order from its object side, a negative lens concave on its image plane side and a positive lens convex on its object side, it works for correction of off-axis aberrations, because the angle of incidence of off-axis light on those surfaces can be small.

Condition (A) is the requirement for specifying the radius of curvature of the object-side surface of the negative lens, and the radii of curvature of the object- and image plane-side surfaces of the positive lens, in the first lens unit.

As the lower limit of 0.3 to condition (A) is not reached, it causes the curvatures of the above three surfaces to become too small to implement correction of off-axis aberrations at the wide-angle end.

As the upper limit of 1.9 to condition (A) is exceeded, it causes the power of any one of the first, the third, and the fourth lens in the first lens unit to become strong, working against slimming down the first lens unit, and giving rise to large fluctuations of aberrations due to decentration.

In consideration of correction of aberrations, that lower limit should preferably be set at 0.5, especially 0.7.

In view of size reductions and holding back aberration fluctuations due to decentration, that upper limit should preferably be set at 1.6, especially 1.4.

The third zoom lens according to the second aspect of the invention is characterized in that in the second zoom lens, the two lenses in the first lens unit have positioning portions capable of positioning them mutually and relatively, where they contact each other with a space across their effective diameter.

The advantage of, and the requirement for, the above third zoom lens arrangement according to the second aspect of the invention is now explained.

The two lenses contact each other at the planar portions vertical to the optical axis, so that any frame for fixing them can be dispensed with; errors in the frame on fabrication and their influences on the mutual relation of them can be factored out. As a result, errors in the lenses in the thrust and tilt directions can be minimized. Especially with conditions (4-1) and (4-2) satisfied at the same time, it is possible to achieve a high-performance optical system with good assemble capability.

The fourth zoom lens according to the second aspect of the invention is characterized in that in any one of the $1^{st}$ to the $3^{rd}$ zoom lens, the first lens unit consists of a negative meniscus lens convex on its object side and a positive lens, and the second lens unit consists of, from its object side, a positive lens and a cemented doublet consisting of a positive lens and a negative lens.

The advantage of, and the requirement for, the above fourth zoom lens arrangement according to the second aspect of the invention is now explained. With that arrangement, the first lens unit, and the second lens unit can be composed of a fewer lenses, and the length of the second lens unit can be shortened, so that the zoom lens can be compactly housed in place.

The fifth zoom lens according to the second aspect of the invention is characterized in that in any one of the $1^{st}$ to the $4^{th}$ zoom lens, aspheric surfaces are applied to both surfaces of the positive lens in the first lens unit, and the third lens unit consists of one positive lens with an aspheric surface applied to its image plane-side surface.

The advantage of, and the requirement for, the above fifth zoom lens arrangement according to the second aspect of the invention is now explained.

The application of aspheric surfaces to both surfaces of the positive lens in the first lens unit allows for satisfactory correction of distortion and field curvature. To the vantage, the application of an aspheric surface to the image plane-side surface in the third lens unit allows for satisfactory correction of field curvature and coma.

The sixth zoom lens according to the second aspect of the invention is characterized in that in the $4^{th}$ zoom lens, the negative lens in the cemented doublet in the second lens unit satisfies the following condition:

$$D_2/f_w < 0.2 \quad (5)$$

where $D_2$ is a (axial) thickness of a middle portion of the negative lens in the cemented doublet in the second lens unit, and $f_w$ is a focal length of the zoom lens system at the wide-angle end.

The advantage of, and the requirement for, the above sixth zoom lens arrangement according to the second aspect of the invention is now explained.

The satisfaction of condition (5) ensures that the total thickness of the second lens unit becomes small, so that the thickness of the zoom lens upon received at a collapsible lens mount can be minimized.

In this regard, the upper limit to condition (5) could be set at 0.15.

Alternatively, it is acceptable to satisfy the following condition (5-1) in lieu of condition (5).

$$D_2/f_{2G} < 0.15 \quad (5-1)$$

where $D_2$ is the (axial) thickness of the middle portion of the negative lens in the cemented doublet in the second lens unit, and $f_{2G}$ is a focal length of the second lens unit.

The satisfaction of condition (5-1) ensures that the total thickness of the second lens unit becomes small, so that the thickness of the zoom lens upon received at a collapsible lens mount can be minimized.

In this regard, the upper limit to condition (5-1) could be set at 0.1.

The seventh zoom lens according to the second aspect of the invention is characterized in that in any one of the $1^{st}$ to the $6^{th}$ zoom lens, the negative lens in the first lens unit satisfies the following condition:

$$0.9 < R_2/f_w < 1.03 \quad (6)$$

where $R_2$ is a paraxial radius of curvature of the image plane-side surface of the negative lens in the first lens unit, and $f_w$ is a focal length of the zoom lens system at the wide-angle end.

The advantage of, and the requirement for, the above $7^{th}$ zoom lens arrangement according to the second aspect of the invention is now explained.

As the lower limit of 0.9 to condition (6) is not reached, it causes the curvature of the negative lens in the first lens unit to become too tight. With this, the center thickness or the edge thickness of the lens grows large, rendering the zoom lens system bulky. As the upper limit of 1.03 is exceeded, it causes the refracting power of the first lens unit to become too small, resulting in a failure in getting hold of sufficient angles of view in the wide-angle end state.

It is acceptable to satisfy the following condition (6-1) in place of condition (6).

$$-0.48 < R_2/f_{1G} < -0.4 \quad (6-1)$$

where $R_2$ is the paraxial radius of curvature of the image plane-side of the negative lens in the first lens unit, and $f_{1G}$ is a focal length of the first lens group.

As the lower limit of −0.48 to condition (6-1) is not reached, it causes the curvature of the negative lens in the first lens unit to become too tight. With this, the center thickness or the edge thickness of the lens grows large, rendering the zoom lens system bulky. As the upper limit of −0.4 is exceeded, it causes the refracting power of the first lens unit to become too small, resulting in a failure in getting hold of sufficient angles of view in the wide-angle end state.

The eighth zoom lens according to the second aspect of the invention is characterized in that in the $6^{th}$ zoom lens, the positive lens in the third lens unit is a plastic lens.

The advantage of, and the requirement for, the above $8^{th}$ zoom lens arrangement according to the second aspect of the invention is now explained. A vitreous material of low refractive index could be used for the third lens unit on condition that conditions (4-1), (4-2) and (5) or (5-1) are satisfied. Even so, it is possible to hold back aberrations produced throughout the first lens unit, the second lens unit and the third lens unit, and it is possible to make use of a plastic lens. It is thus possible to obtain a high-quality, high-performance yet lightweight zoom lens at low costs.

The ninth zoom lens according to the second aspect of the invention is characterized in that in any one of the $1^{st}$ to the $8^{th}$ zoom lens, the positive lens located in, and nearest to the object side of, the second lens unit is an aspheric lens.

The advantage of, and the requirement for, the above $9^{th}$ zoom lens arrangement according to the second aspect of the invention is now explained. The object-side positive lens in the second lens unit receives an axial light beam divergent from the first lens unit. Here, as the refracting power of that lens is increased to give convergence to the divergent light beam, it works for compactness. At that positive lens, on the other hand, spherical aberrations are likely to occur because of its strong refracting power. Here, if the object-side positive lens is configured as an aspheric lens, it is then possible to reduce the occurrence of longitudinal aberrations.

The $10^{th}$ zoom lens according to the second aspect of the invention is characterized in that in any one of the $1^{st}$ to the $8^{th}$ zoom lens, a stop that moves together with the second lens unit is located on an object side farther off the lens located in, and nearest to the object side of, the second lens unit.

The advantage of, and the requirement for, the above $10^{th}$ zoom lens arrangement according to the second aspect of the invention is now explained. Such being the arrangement, the stop is so near to the second lens unit that the second lens unit can be favorably slimmed down, and telecentric capability is easily ensured. Another advantage is that the off-axis light rays incident on the first lens become not that high.

The $11^{th}$ zoom lens according to the second aspect of the invention is characterized by comprising a plurality of lens units inclusive of a first lens unit located nearest to its object side and having negative refracting power, with the space between adjacent lens units varied for zooming, wherein:

the first lens unit consist of, in order from its object side, a first lens of negative refracting power and a second lens of positive refracting power, wherein an image plane-side surface of the first lens is provided with a planar portion that lies beyond its effective diameter and vertical to an optical axis and an object-side surface of the second lens is provided with a planar portion that lies beyond its effective diameter and vertical to an optical axis such that the planar portion of the first lens and the planar portion of the second lens are positioned in contact with each other.

The advantage of, and the requirement for, the $11^{th}$ zoom lens arrangement according to the second aspect of the invention is now explained.

The two lenses contact each other at the planar portions vertical to the optical axis, so that any frame for fixing them can be dispensed with; errors in the frame on fabrication and their influences on the mutual relation of them can be factored out. As a result, errors in the lenses in the thrust and tilt directions can be minimized.

The $12^{th}$ zoom lens according to the second aspect of the invention is characterized in that in the $11^{th}$ zoom lens, the first lens and/or the second lens are glass molded lenses, wherein:

an image plane-side surface of the first lens is provided beyond its effective diameter with a planar portion integral with that surface and vertical to the optical axis and an object-side surface of the second lens is provided beyond its effective diameter with a planar portion integral with that surface and vertical to the optical axis such that the planar portion of the first lens and the planar portion of the second lens are positioned in contact with each other.

The advantage of, and the requirement for, the above $12^{th}$ zoom lens arrangement according to the second aspect of the invention is now explained. If the planar portions of the surfaces provided beyond their effective diameter and vertical to the optical axis are integrally molded with those surfaces, such portions can then be formed with precision.

The $13^{th}$ zoom lens according to the second aspect of the invention is characterized in that in the $11^{th}$ or the $12^{th}$ zoom lens, the object-side surface of the second lens is provided with the planar portion in a form that continues smoothly from the optical axis.

The advantage of, and the requirement for, the $13^{th}$ zoom lens arrangement according to the second aspect of the invention is now explained. Such being the arrangement, the lens can be formed with the planar portion continuing to the effective portion; it can be easily processed.

The $14^{th}$ zoom lens according to the second aspect of the invention is characterized in that in any one of the $11^{th}$ to the $13^{th}$ zoom lens, the following condition is satisfied with respect to the refractive index, $n_1$, of the negative first lens, and the refractive index, $n_2$, of the positive second lens, in the first lens unit:

$$n_1 > 1.8 \quad (4\text{-}1)$$

$$n_2 > 1.8 \quad (4\text{-}2)$$

The advantage of, and the requirement for, the above $14^{th}$ zoom lens arrangement according to the second aspect of the invention is now explained.

To reduce the total length and diameter of the zoom lens, it is of importance to use lenses having a refractive index of 1.8 or greater in the first lens unit. However, this causes influences of the tilt and thrust of both lenses to grow large. Therefore, if the first lens and the second lens are assembled together while their planar portions are positioned in contact with each other, those influences can be minimized; vitreous materials of $n_1 > 1.8$ and $n_2 > 1.8$ can be used.

Especially as the refractive index of the positive lens grows high, it makes it easy to decrease the curvature of the object-side surface of the positive lens in the first lens unit. Therefore, if the effective portion continues smoothly to the planar portion at the time of fabricating that positive lens by means of molding, lens fabrication is then facilitated.

The $15^{th}$ zoom lens according to the second aspect of the invention is characterized in that in any one of the $11^{th}$ to the $14^{th}$ zoom lens, a negative first lens unit, a positive second lens unit, and a positive third lens unit are provided in order form its object side.

The advantage of, and the requirement for, the above $15^{th}$ zoom lens arrangement according to the second aspect of the invention is now explained. With the three units type arrangement having a negative-positive-positive refracting power profile, it is possible to obtain a slimmed-down zoom lens having a zoom ratio of the order of 3 while sufficient telecentric capability is kept. To make the zoom lens compact while zoom ratios of at least two are obtained, a positive lens is used in the third lens unit, thereby getting hold of telecentric capability and implementing correction of an image plane.

The $16^{th}$ zoom lens according to the second aspect of the invention is characterized in that in the $15^{th}$ zoom lens, the second lens unit consists of two positive lenses and one negative lens, the third lens unit consists of one positive lens, aspheric surfaces are applied to both surfaces of the second lens in the first lens unit, and the positive lens in the third lens unit is an aspheric lens.

The advantage of, and the requirement for, the above $16^{th}$ zoom lens arrangement according to the second aspect of the invention is now explained. The use of aspheric surfaces in the first lens unit allows for satisfactory correction of distortion and field curvature, and the use of an aspheric lens in the third lens unit ensures satisfactory correction of field curvature and come.

The 17$^{th}$ zoom lens according to the second aspect of the invention is characterized in that in any one of the 11$^{th}$ to the 16$^{th}$ zoom lens, the first lens unit consists of a negative meniscus lens convex on its object side and a positive lens, and the second lens group consists of, in order from its object side, a positive lens and a cemented doublet composed of a positive lens and a negative lens.

The advantage of, and the requirement for, the above 17$^{th}$ zoom lens arrangement according to the second aspect of the invention is now explained. With that arrangement, a limited number of lenses are used in the first lens unit and the second lens unit so that the length of the second lens unit can be shortened to make the zoom lens housed in place compact.

Two or more such requirements as described above could be satisfied at the same time.

The imaging system according to the invention is characterized by comprising the zoom lens according to the first aspect, and the second aspect of the invention, as described above.

According to the invention, it is possible to provide a zoom lens that has a zoom ratio of the order of 3, sufficiently compact size and improved optical properties, and an electronic system that incorporates it.

It is also possible to provide a zoom lens of the type having a negative lens unit at the front, which has a suitable zoom ratio, sufficiently compact size and improved optical properties.

Further, it is possible to provide a zoom lens of the type having a negative lens unit at the front, which is much less susceptible to errors on fabrication, so that it can be fabricated at far lower costs, while having sufficiently compact size and improved optical properties.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 is a collection of diagrams indicative of spherical aberrations, astigmatisms, distortions, chromatic aberrations of magnification and comae (longitudinal aberrations) of the zoom lens according to Example 2 in (a) a wide-angle end state, (b) an intermediate setting state and (c) a telephoto end state upon focusing at infinity.

FIG. 19 is a sectional view of the digital camera of FIG. 17.

DESCRIPTION OF THE PREFERRED EMBODIMENTS

Figure 1A:
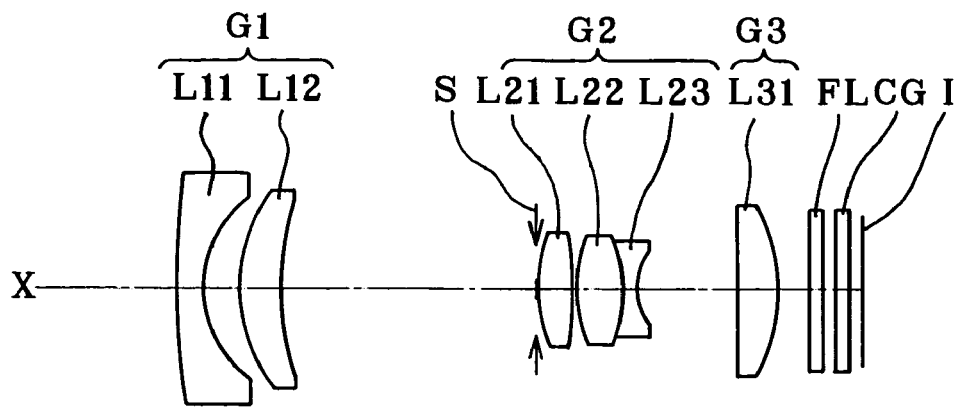
FIG. 1 is a collection of sectional views of the optical arrangement of the zoom lens according to Example 1 of the invention, as taken along the optical axis in (a) a wide-angle end state, (b) an intermediate setting state, and (c) a telephoto end state, respectively.

Prior to given an explanation of the embodiments according to the invention, the advantages of, and the requirements for, the invention are now set forth.

A three units type arrangement comprising, in order from its object side, a first lens unit of negative refracting power, a second lens unit of positive refracting power and a third lens unit of positive refracting power, as contemplated herein, could have a zoom ratio of the order of 3 in a slimmed-down form.

If one positive lens is used in the third lens unit, as contemplated herein, it is then possible to achieve a zoom lens of compact construction, which is operable to implement image plane correction and zooming while getting hold of a zoom ratio of 2 or greater.

As in the first aspect of the invention, it is preferable to satisfy the following condition:

$$0.5 < (R_1 - R_2)/(R_1 + R_2) < 0.95 \tag{1}$$

where $R_1$ is the axial radius of curvature of the object-side surface of the positive lens in the third lens unit, and $R_2$ is the axial radius of curvature of the image-side surface of the positive lens in the third lens unit.

The value of $(R_1-R_2)/(R_1+R_2)$ exceeding the upper limit to condition (1) is not preferable, because ghosts are likely to occur at the third lens unit and a low-pass filter or cover glass, and spot flares are likely to occur as well.

On the other hand, the value of $(R_1-R_2)/(R_1+R_2)$ being shy of the lower limit to condition (1) is again not preferable, because of a failure in obtaining any sufficient power for correcting aberrations including spherical aberrations.

More preferably, $$0.8<(R_1-R_2)/(R_1+R_2)<0.92 \tag{1-1}$$

where $R_1$ is the axial radius of curvature of the object-side surface of the positive lens in the third lens unit, and $R_2$ is the axial radius of curvature of the image-side surface of the positive lens in the third lens unit.

If, in the first aspect of the invention, aspheric surfaces are applied to the image plane-side surface of the negative meniscus lens in the first lens unit, convex on its object side, and the image plane-side surface of the positive meniscus lens in the third lens unit, one per each, distortion and field curvature can then be well corrected.

Further, if an aspheric surface is applied to the image plane-side of the positive meniscus lens in the third lens unit, field curvature and coma can then be well corrected.

In the first aspect of the invention, it is preferable for the double-convex lens in the cemented doublet in the second lens unit to satisfy the following condition (2):

$$|(R_3+R_4)/(R_3-R_4)|<0.1 \tag{2}$$

where $R_3$ is the axial radius of curvature of the object-side surface of the double-convex lens in the cemented lens in the second lens unit, and $R_4$ is the axial radius of curvature of the image-side surface of the double-convex lens in the cemented lens in the second lens unit.

The value of $|(R_3+R_4)/(R_3-R_4)|$ exceeding the upper limit to condition (2) is not preferable because of difficulty in lens fabrication.

More preferably, $$|(R_3+R_4)/(R_3-R_4)|<0.05 \tag{2-1}$$

If, in the first aspect of the invention, the absolute values of the curvatures of both surfaces of the double-convex lens in the cemented doublet in the second lens unit are equal, lens fabrication can then be more facilitated, leading to improvements in productivity and yield.

If the above conditions (1) and (2) are satisfied, vitreous materials of lower refractive index can then be used to minimize aberrations occurring throughout the first to the third lens unit.

If, in the first aspect of the invention, a plastic lens is used for the positive lens that forms the third lens unit, it is then possible to set up a higher-quality, higher-performance zoom lens at far lower costs.

In the first aspect of the invention, it is preferable to satisfy the following condition (3):

$$D_2/D_1<1.5 \tag{3}$$

where $D_1$ is the axial thickness of the lens located in, and nearest to the object side of, the first lens unit, and $D_2$ is the axial air separation between the first lens and the second lens in the first lens unit.

If condition (3) is satisfied as is the case with the zoom lens of the invention, the whole length of the optical system and the thickness of the optical system upon received at a collapsible lens mount can then be minimized.

More preferably, $$D_2/D_1<1.42 \tag{3-1}$$

Examples 1, 2 and 3 of the zoom lens according to the first aspect of the invention are now explained with reference to the accompanying drawings.

Figure 1B:
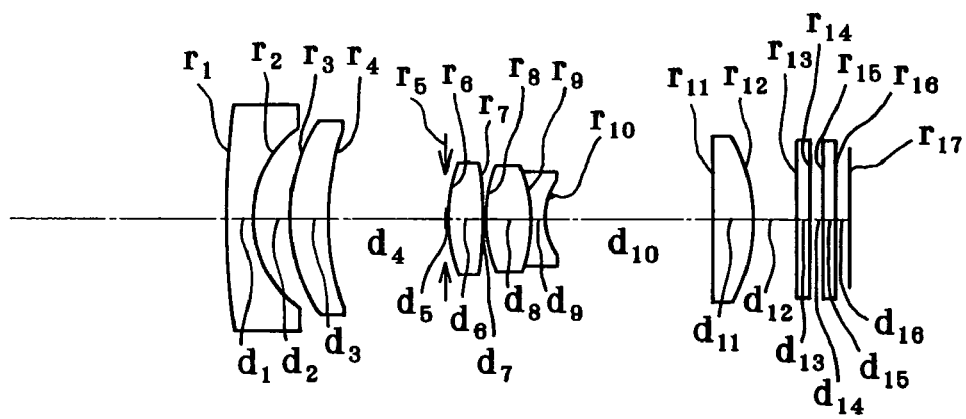
Figure 1C:
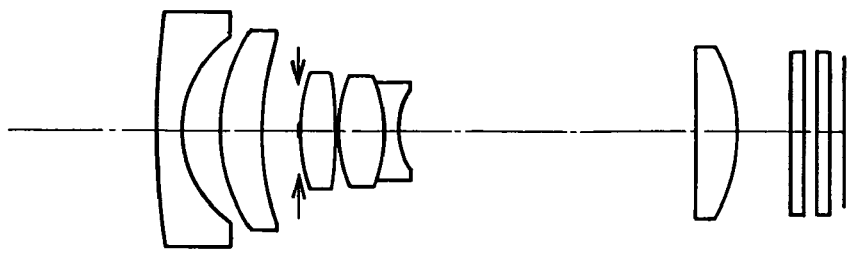
Figure 4A:
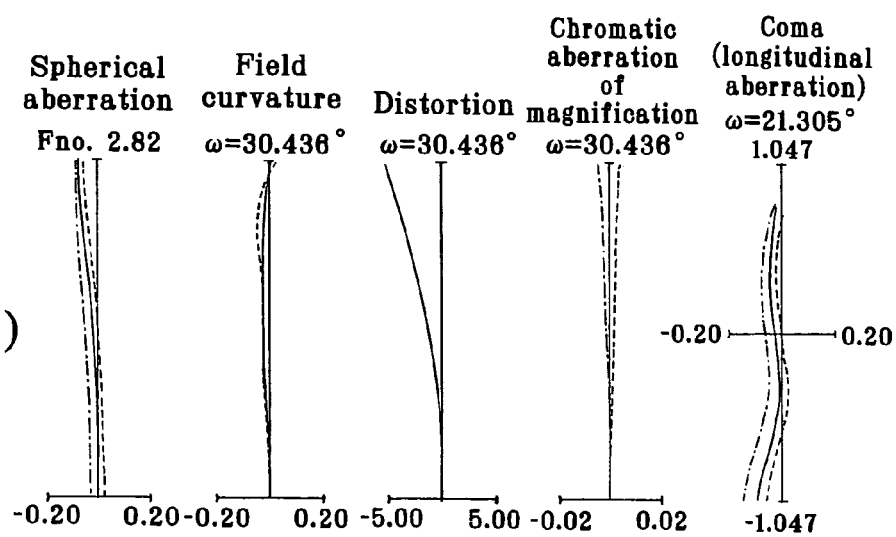
FIG. 4 is a collection of diagrams indicative of spherical aberrations, astigmatisms, distortions, chromatic aberrations of magnification and comae (longitudinal aberrations) of the zoom lens according to Example 1 in (a) a wide-angle end state, (b) an intermediate setting state and (c) a telephoto end state upon focusing at infinity.
Figure 4B:
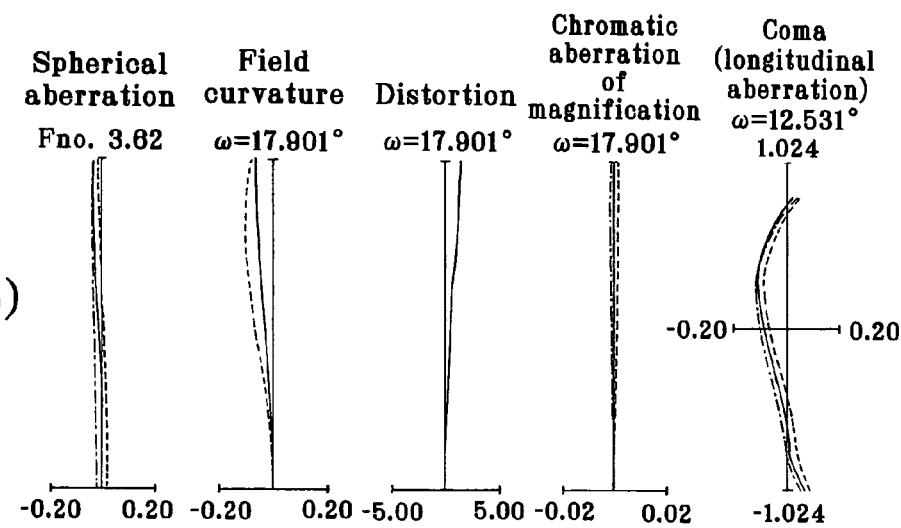
Figure 4C:
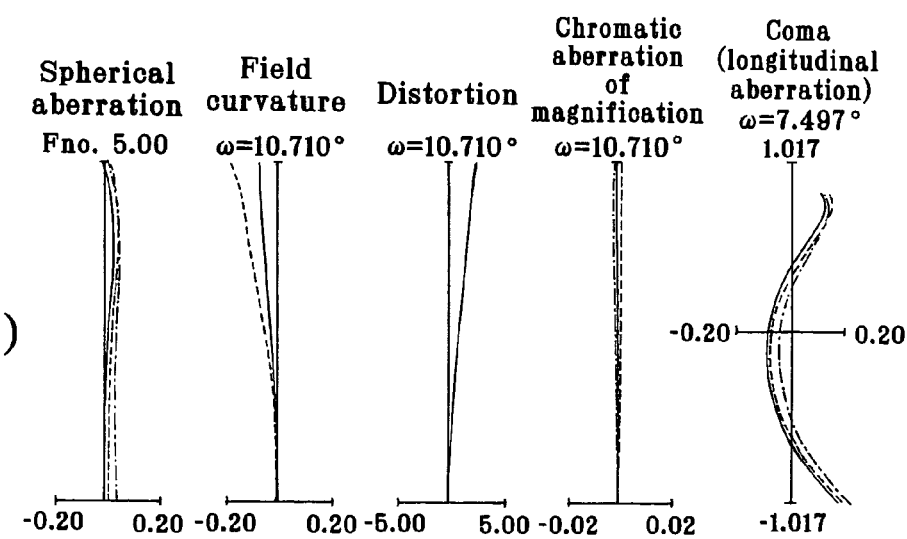

FIG. 1 is a collection of sectional views of the optical arrangement of Example 1 of the zoom lens according to the first aspect of the invention, as taken along its optical axis. In FIG. 1, (a), (b) and (c) are illustrative of states at the wide-angle end, in an intermediate setting, and at the telephoto end. FIG. 4 is a collection of diagrams indicative of spherical aberrations, astigmatisms, distortions, chromatic aberrations of magnification and comae (longitudinal aberrations) of the zoom lens according to Example 1 in (a) a wide-angle end state, (b) an intermediate setting state and (c) a telephoto end state upon focusing at infinity.

EXAMPLE 1

This example is directed to a zoom optical system according to the first aspect of the invention, which is made up of, from an object side X toward an imaging plane I, a first lens unit G1 having negative refracting power, a second lens unit G2 having positive refracting power and a third lens unit G3 having positive refracting power, as depicted in FIG. 1. In FIG. 1, S is indicative of an aperture stop, FL of a plane-parallel plate such as a low-pass filter, and an infrared absorption filter, CG of a cover glass, and I of an imaging plane.

Having negative refracting power, the first lens unit G1 is composed of a negative meniscus lens L11 convex on its object side and a positive meniscus lens L12 convex on its object side, between which an air separation is provided.

Having generally positive refracting power, the second lens unit G2 is located on the side of the first lens unit G1 facing the imaging plane I with an aperture stop S between it and the first lens unit G1, and comprises, in order from the object side X, a double-convex lens L21 and a cemented doublet consisting of a double-convex lens L22 and a double-concave lens L23, with an air separation between them.

Having generally positive refracting power, the third lens unit G3 is built up of a positive meniscus lens L31 that is concave on its object side. On the side of the third lens unit G3 facing the imaging plane I and between the third lens unit G3 and the imaging plane I, there are provided a plane-parallel plate FL and a cover glass CG.

Four aspheric surfaces are applied: one to the image-side surface of the negative meniscus lens L11 in the first lens unit G1, two to both surfaces of the double-convex lens L21 in the second lens unit G2, and one to the image-side surface of the positive meniscus lens L31 in the third lens unit G3.

Upon zooming from the wide-angle end (a) to the telephoto end (c), the first lens unit G1 moves in a convex locus toward the image side, and the second lens unit G2 and the third lens unit G3 move from the side of the image plane I to the object side X, respectively. Here, the respective lens units move such that a space $d_4$ between the first lens unit G1 and the second lens unit G2 becomes narrow, and a space $d_{10}$ between the second lens unit G2 and the third lens unit G3, and a space $d_{12}$ between the third lens unit G3 and the plane-parallel plate FL becomes wide. Note that the imaging plane I is positioned in the effective imaging diagonal direction of a CCD or CMOS sensor.

Figure 2A:
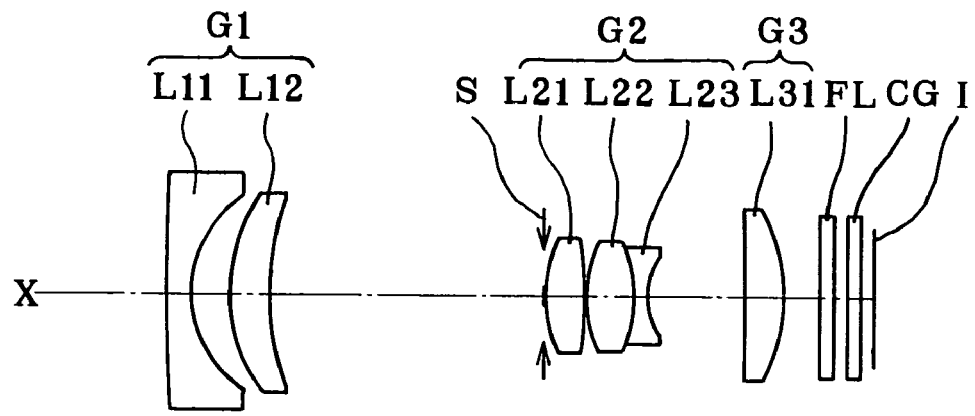
FIG. 2 is a collection of sectional views of the optical arrangement of the zoom lens according to Example 2 of the invention, as taken along the optical axis in (a) a wide-angle end state, (b) an intermediate setting state, and (c) a telephoto end state, respectively.
Figure 2B:
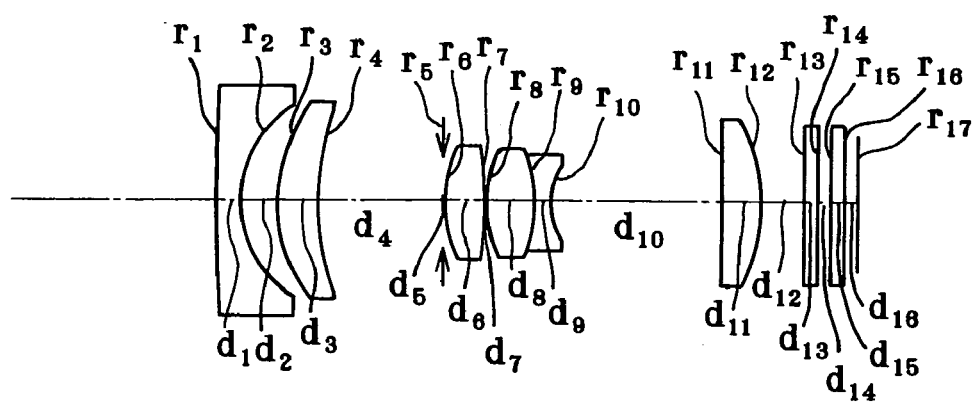
Figure 2C:
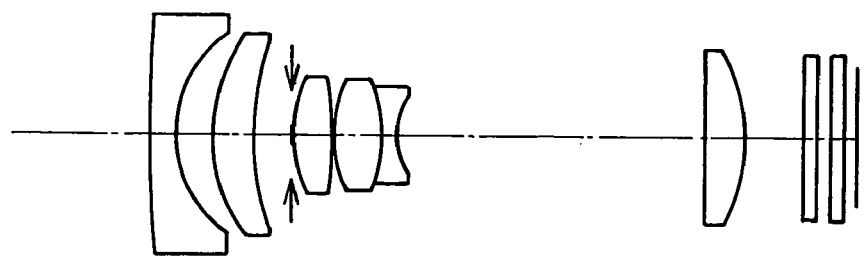

FIG. 2 is a collection of sectional views of the optical arrangement of Example 2 according to the first aspect of the invention, as taken along its optical axis. In FIG. 2, (a), (b) and (c) are illustrative of states at the wide-angle end, in an intermediate setting, and at the telephoto end. FIG. 5 is a collection of diagrams indicative of spherical aberrations, astigmatisms, distortions, chromatic aberrations of magnification and comae (longitudinal aberrations) of the zoom lens according to Example 2 in (a) a wide-angle end state, (b) an intermediate setting state and (c) a telephoto end state upon focusing at infinity.

EXAMPLE 2

This example is directed to a zoom optical system according to the invention, which is made up of, from an object side X toward an imaging plane I, a first lens unit G1 having negative refracting power, a second lens unit G2 having positive refracting power and a third lens unit G3 having positive refracting power, as depicted in FIG. 2. In FIG. 2, S is indicative of an aperture stop, FL of a plane-parallel plate such as a low-pass filter, and an infrared absorption filter, CG of a cover glass, and I of an imaging plane.

Having negative refracting power, the first lens unit G1 is composed of a negative meniscus lens L11 convex on its object side and a positive meniscus lens L12 convex on its object side, between which an air separation is provided.

Having generally positive refracting power, the second lens unit G2 is located on the side of the first lens unit G1 facing the imaging plane I with an aperture stop S between it and the first lens unit G1, and comprises, in order from the object side X, a double-convex lens L21 and a cemented doublet consisting of a double-convex lens L22 and a double-concave lens L23, with an air separation between them.

Having generally positive refracting power, the third lens unit G3 is built up of a positive meniscus lens L31 that is concave on its object side. On the side of the third lens unit G3 facing the imaging plane I and between the third lens unit G3 and the imaging plane I, there are provided a plane-parallel plate FL and a cover glass CG.

Four aspheric surfaces are applied: one to the image-side surface of the negative meniscus lens L11 in the first lens unit G1, two to both surfaces of the double-convex lens L21 in the second lens unit G2, and one to the image-side surface of the positive meniscus lens L31 in the third lens unit G3.

Upon zooming from the wide-angle end (a) to the telephoto end (c), the first lens unit G1 moves in a convex locus toward the image side, and the second lens unit G2 and the third lens unit G3 move from the side of the image plane I to the object side X, respectively. Here, the respective lens units move such that a space $d_4$ between the first lens unit G1 and the second lens unit G2 becomes narrow, and a space $d_{10}$ between the second lens unit G2 and the third lens unit G3, and a space $d_{12}$ between the third lens unit G3 and the plane-parallel plate FL becomes wide. Note that the imaging plane I is positioned in the effective imaging diagonal direction of a CCD or CMOS sensor.

Figure 3A:
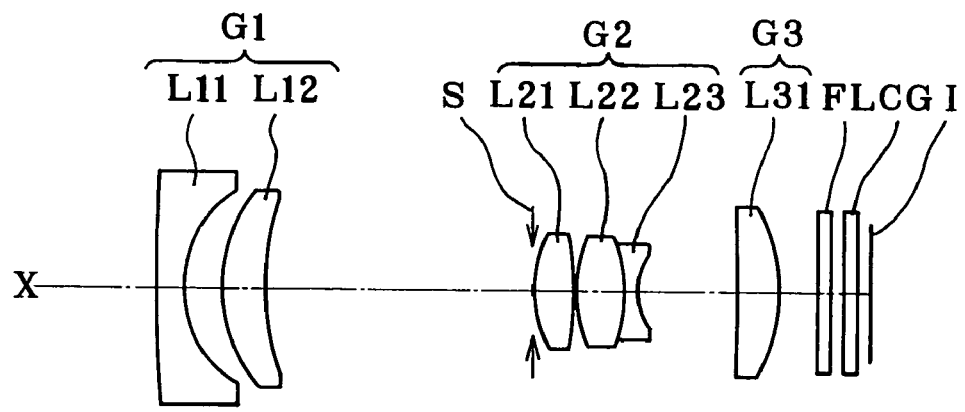
FIG. 3 is a collection of sectional views of the optical arrangement of the zoom lens according to Example 3 of the invention, as taken along the optical axis in (a) a wide-angle end state, (b) an intermediate setting state, and (c) a telephoto end state, respectively.
Figure 3B:
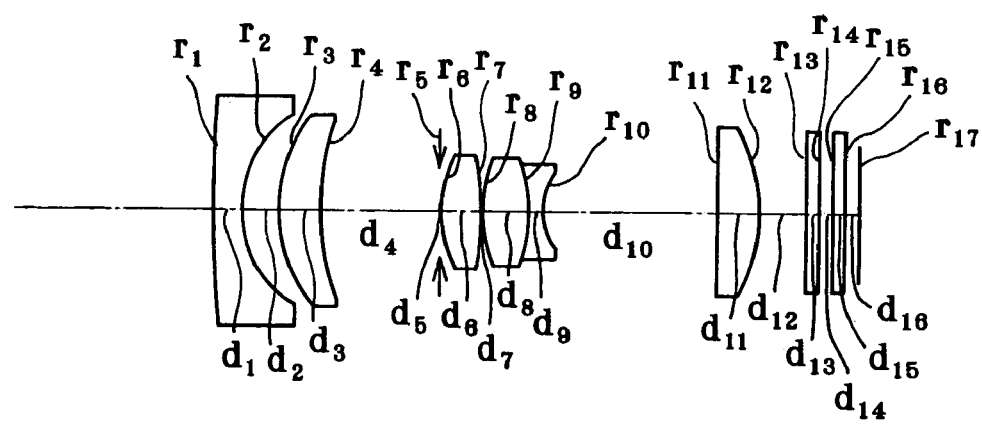
Figure 3C:
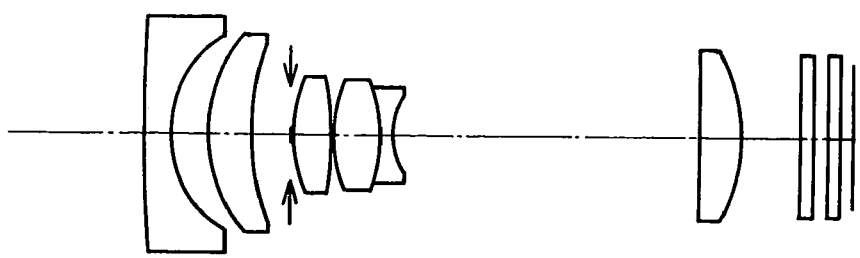
Figure 6A:
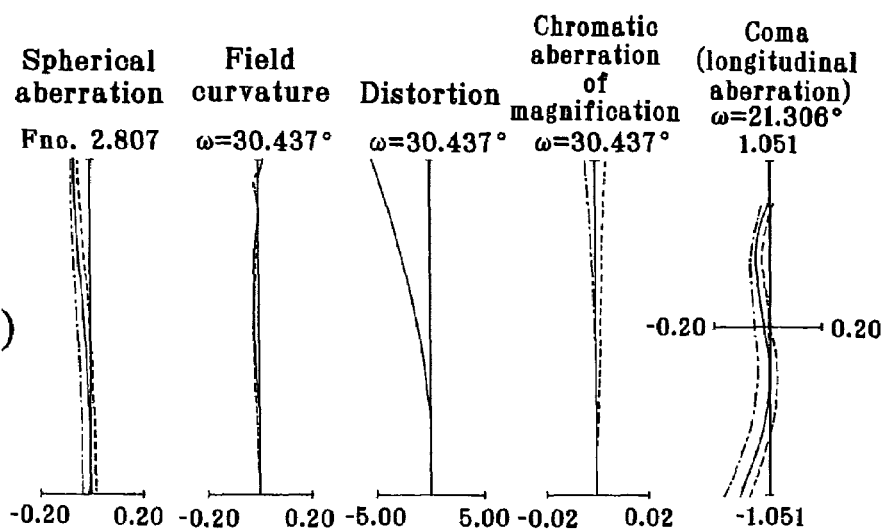
FIG. 6 is a collection of diagrams indicative of spherical aberrations, astigmatisms, distortions, chromatic aberrations of magnification and comae (longitudinal aberrations) of the zoom lens according to Example 3 in (a) a wide-angle end state, (b) an intermediate setting state and (c) a telephoto end state upon focusing at infinity.
Figure 6B:
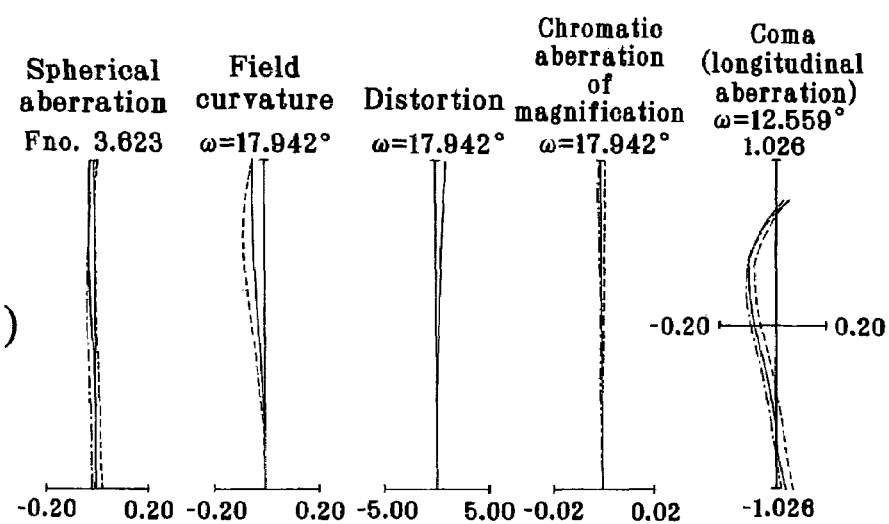
Figure 6C:
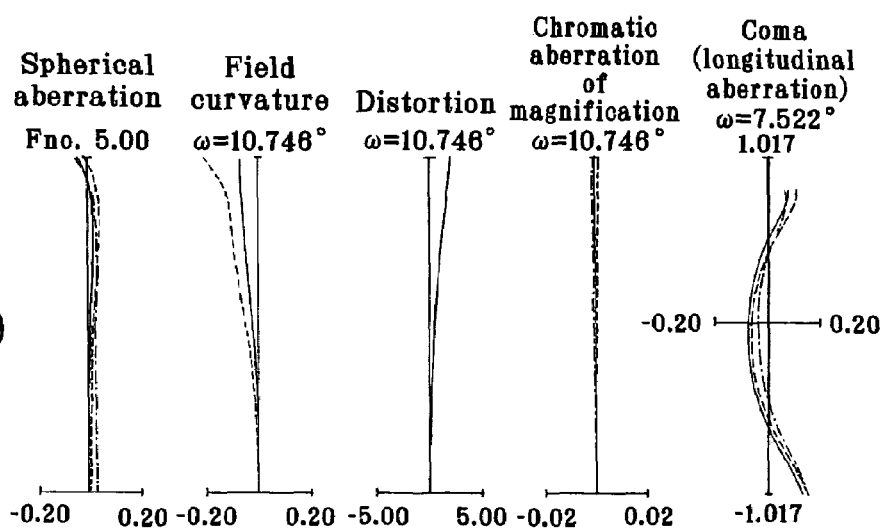

FIG. 3 is a collection of sectional views of the optical arrangement of Example 3 according to the first aspect of the invention, as taken along its optical axis. In FIG. 3, (a), (b) and (c) are illustrative of states) at the wide-angle end, in an intermediate setting, and at the telephoto end. FIG. 6 is a collection of diagrams indicative of spherical aberrations, astigmatisms, distortions, chromatic aberrations of magnification and comae (longitudinal aberrations) of the zoom lens according to Example 3 in (a) a wide-angle end state, (b) an intermediate setting state and (c) a telephoto end state upon focusing at infinity.

EXAMPLE 3

This example is directed to a zoom optical system according to the invention, which is made up of, from an object side X toward an imaging plane I, a first lens unit G1 having negative refracting power, a second lens unit G2 having positive refracting power and a third lens unit G3 having positive refracting power, as depicted in FIG. 3. In FIG. 3, S is indicative of an aperture stop, FL of a plane-parallel plate such as a low-pass filter, and an infrared absorption filter, CG of a cover glass, and I of an imaging plane.

Having negative refracting power, the first lens unit G1 is composed of a negative meniscus lens L11 convex on its object side and a positive meniscus lens L12 convex on its object side, between which an air separation is provided.

Having generally positive refracting power, the second lens unit G2 is located on the side of the first lens unit G1 facing the imaging plane I with an aperture stop S between it and the first lens unit G1, and comprises, in order from the object side X, a double-convex lens L21 and a cemented doublet consisting of a double-convex lens L22 and a double-concave lens L23, with an air separation between them.

Having generally positive refracting power, the third lens unit G3 is built up of a positive meniscus lens L31 that is concave on its object side. On the side of the third lens unit G3 facing the imaging plane I and between the third lens unit G3 and the imaging plane I, there are provided a plane-parallel plate FL and a cover glass CG.

Four aspheric surfaces are applied: one to the image-side surface of the negative meniscus lens L11 in the first lens unit G1, two to both surfaces of the double-convex lens L21 in the second lens unit G2, and one to the image-side surface of the positive meniscus lens L31 in the third lens unit G3.

Upon zooming from the wide-angle end (a) to the telephoto end (c), the first lens unit G1 moves in a convex locus toward the image side, and the second lens unit G2 and the third lens unit G3 move from the side of the image plane I to the object side X, respectively. Here, the respective lens units move such that a space $d_4$ between the first lens unit G1 and the second lens unit G2 becomes narrow, and a space $d_{10}$ between the second lens unit G2 and the third lens unit G3, and a space $d_{12}$ between the third lens unit G3 and the plane-parallel plate FL becomes wide. Note that the imaging plane I is positioned in the effective imaging diagonal direction of a CCD or CMOS sensor.

Enumerated below are the numerical data in each of the above Examples 1-3. The symbols used hereinafter but not hereinbefore have the following meanings:

f: focal length of the zoom optical system, $F_{NO}$: F-number,

ω: half angle of view,

IH: image height (about a half the diagonal length of an effective imaging area), WE: wide-angle end, ST: intermediate setting, TE: telephoto end, $r_1$, $r_2$, etc.: radius of curvature of each lens surface (mm), $d_1$, $d_2$, etc.: space between adjacent lens surfaces (mm), $n_{d1}$, $n_{d2}$, etc.: d-line (587.6 nm) refractive index of each lens, and $V_{d1}$, $V_{d2}$, etc.: d-line (587.6 nm) Abbe constant of each lens. Note that aspheric surface configuration is given by the following formula provided that x is indicative of an optical axis with the direction of travel of light taken as positive and y is indicative of a direction orthogonal to the optical axis.

$$x = (y^2/r)/\left[1 + \{1-(K+1)(y/r)^2\}^{1/2}\right] + A_4 y^4 + A_6 y^6 + A_8 y^8 + A_{10} y^{10} + A_{12} y^{12}$$

where r is a paraxial radius of curvature, K is a conical coefficient, and A4, A6, A8, A10 and A12 are the $4^{th}$-, $6^{th}$-, $8^{th}$-, $10^{th}$- and $12^{th}$-order aspherical coefficients, respectively.

EXAMPLE 1

IH: 3.60 mm

| | | | |
|---|---|---|---|
| $r_1$ = 82.28 | $d_1$ = 1.5 | $n_{d1}$ = 1.80495 | $v_{d1}$ = 40.9 |
| $r_2$ = 5.964 (Aspheric) | $d_2$ = 1.98 | | |
| $r_3$ = 9.004 | $d_3$ = 2.3 | $n_{d2}$ = 1.84666 | $v_{d2}$ = 23.78 |
| $r_4$ = 17.26 | $d_4$ = (Variable) | | |
| $r_5$ = ∞ (Stop) | $d_5$ = 0.15 | | |
| $r_6$ = 9.068 (Aspheric) | $d_6$ = 2.0 | $n_{d3}$ = 1.58223 | $v_{d3}$ = 59.38 |
| $r_7$ = −20.88 (Aspheric) | $d_7$ = 0.15 | | |
| $r_8$ = 7.721 | $d_8$ = 2.68 | $n_{d4}$ = 1.72916 | $v_{d4}$ = 54.68 |
| $r_9$ = −7.721 | $d_9$ = 0.7 | $n_{d5}$ = 1.64769 | $v_{d5}$ = 33.79 |
| $r_{10}$ = 3.968 | $d_{10}$ = (Variable) | | |
| $r_{11}$ = −200 | $d_{11}$ = 2.2 | $n_{d6}$ = 1.52542 | $v_{d6}$ = 55.78 |
| $r_{12}$ = −9.233 (Aspheric) | $d_{12}$ = (Variable) | | |
| $r_{13}$ = ∞ | $d_{13}$ = 0.77 | $n_{d7}$ = 1.54771 | $v_{d7}$ = 62.84 |
| $r_{14}$ = ∞ | $d_{14}$ = 0.8 | | |
| $r_{15}$ = ∞ | $d_{15}$ = 0.5 | $n_{d8}$ = 1.51633 | $v_{d8}$ = 64.14 |
| $r_{16}$ = ∞ | $d_{16}$ = 0.8 | | |
| $r_{17}$ = ∞ (Imaging plane) | | | |

Aspherical Coefficients

2nd surface

K = 0.0917
$A_4$ = −3.42 × $10^{-4}$
$A_6$ = 4.94 × $10^{-6}$
$A_8$ = −1.26 × $10^{-6}$
$A_{10}$ = 4.54 × $10^{-8}$
$A_{12}$ = −1.07 × $10^{-9}$

6th surface

K = −1.35
$A_4$ = −8.81 × $10^{-5}$
$A_6$ = 1.50 × $10^{-5}$
$A_8$ = −5.43 × $10^{-7}$
$A_{10}$ = 0.00
$A_{12}$ = 0.00

7th surface

K = 0.359
$A_4$ = 8.86 × $10^{-5}$
$A_6$ = 1.94 × $10^{-5}$
$A_8$ = −6.38 × $10^{-7}$

-continued $A_{10}$ = 0.00
$A_{12}$ = 0.00

12th surface

K = −0.911
$A_4$ = 3.21 × $10^{-4}$
$A_6$ = −9.52 × $10^{-6}$
$A_8$ = 3.83 × $10^{-7}$
$A_{10}$ = −8.41 × $10^{-9}$
$A_{12}$ = 0.00

Zooming Data (∞)

| | WE | ST | TE |
|---|---|---|---|
| f (mm) | 6.45 | 11 | 18.59 |
| $F_{NO}$ | 2.82 | 3.62 | 5.00 |
| ω (°) | 30.436 | 17.901 | 10.710 |
| $d_4$ | 14.87 | 6.71 | 2.07 |
| $d_{10}$ | 5.32 | 9.39 | 16.87 |
| $d_{12}$ | 1.89 | 2.36 | 3.00 |

EXAMPLE 2

IH: 3.60 mm

| | | | |
|---|---|---|---|
| $r_1$ = 89.04 | $d_1$ = 1.5 | $n_{d1}$ = 1.8061 | $v_{d1}$ = 40.73 |
| $r_2$ = 5.91 (Aspheric) | $d_2$ = 1.98 | | |
| $r_3$ = 9.00 | $d_3$ = 2.3 | $n_{d2}$ = 1.84666 | $v_{d2}$ = 23.78 |
| $r_4$ = 17.81 | $d_4$ = (Variable) | | |
| $r_5$ = ∞ (Stop) | $d_5$ = 0.15 | | |
| $r_6$ = 8.87 (Aspheric) | $d_6$ = 2.08 | $n_{d3}$ = 1.58223 | $v_{d3}$ = 59.46 |
| $r_7$ = −22.02 (Aspheric) | $d_7$ = 0.15 | | |
| $r_8$ = 7.51 | $d_8$ = 2.6 | $n_{d4}$ = 1.72916 | $v_{d4}$ = 54.68 |
| $r_9$ = −7.78 | $d_9$ = 0.70 | $n_{d5}$ = 1.64769 | $v_{d5}$ = 33.79 |
| $r_{10}$ = 3.88 | $d_{10}$ = (Variable) | | |
| $r_{11}$ = −200 | $d_{11}$ = 2.2 | $n_{d6}$ = 1.52542 | $v_{d6}$ = 55.78 |
| $r_{12}$ = −9.255 (Aspheric) | $d_{12}$ = (Variable) | | |
| $r_{13}$ = ∞ | $d_{13}$ = 0.77 | $n_{d7}$ = 1.54771 | $v_{d7}$ = 62.84 |
| $r_{14}$ = ∞ | $d_{14}$ = 0.8 | | |
| $r_{15}$ = ∞ | $d_{15}$ = 0.5 | $n_{d8}$ = 1.51633 | $v_{d8}$ = 64.14 |
| $r_{16}$ = ∞ | $d_{16}$ = 0.8 | | |
| $r_{17}$ = ∞ (Imaging plane) | | | |

Aspherical Coefficients

2nd surface

K = 0.2174
$A_4$ = −4.19 × $10^{-4}$
$A_6$ = −8.48 × $10^{-7}$
$A_8$ = −1.32 × $10^{-6}$
$A_{10}$ = 5.87 × $10^{-8}$
$A_{12}$ = −1.93 × $10^{-9}$

6th surface

K = −0.7397
$A_4$ = −2.03 × $10^{-4}$
$A_6$ = 1.55 × $10^{-5}$
$A_8$ = −4.53 × $10^{-7}$
$A_{10}$ = 0.00
$A_{12}$ = 0.00

-continued

7th surface

K = −0.2624
$A_4 = 6.05 \times 10^{-5}$
$A_6 = 2.04 \times 10^{-5}$
$A_8 = -5.18 \times 10^{-7}$
$A_{10} = 0.00$
$A_{12} = 0.00$ 12th surface K = −1.0722
$A_4 = 2.72 \times 10^{-4}$
$A_6 = -1.15 \times 10^{-5}$
$A_8 = 6.22 \times 10^{-7}$
$A_{10} = -1.63 \times 10^{-8}$
$A_{12} = 0.00$ Zooming Data (∞)

|  | WE | ST | TE |
|---|---|---|---|
| f (mm) | 6.45 | 11 | 18.59 |
| $F_{NO}$ | 2.81 | 3.63 | 5.00 |
| ω (°) | 30.433 | 17.942 | 10.748 |
| $d_4$ | 14.86 | 6.76 | 2.07 |
| $d_{10}$ | 5.34 | 9.49 | 16.94 |
| $d_{12}$ | 1.91 | 2.31 | 3.00 |

EXAMPLE 3

IH: 3.60 mm

| $r_1$ = 91.89 | $d_1$ = 1.4 | $n_{d1}$ = 1.8061 | $v_{d1}$ = 40.73 |
|---|---|---|---|
| $r_2$ = 5.884 (Aspheric) | $d_2$ = 1.98 | | |
| $r_3$ = 9.0 | $d_3$ = 2.3 | $n_{d2}$ = 1.84666 | $v_{d2}$ = 23.78 |
| $r_4$ = 18.15 | $d_4$ = (Variable) | | |
| $r_5$ = ∞ (Stop) | $d_5$ = 0.15 | | |
| $r_6$ = 8.475 (Aspheric) | $d_6$ = 2.1 | $n_{d3}$ = 1.58313 | $v_{d3}$ = 59.46 |
| $r_7$ = −20.31 (Aspheric) | $d_7$ = 0.15 | | |
| $r_8$ = 8.249 | $d_8$ = 2.6 | $n_{d4}$ = 1.72916 | $v_{d4}$ = 54.68 |
| $r_9$ = −7.548 | $d_9$ = 0.7 | $n_{d5}$ = 1.64769 | $v_{d5}$ = 33.79 |
| $r_{10}$ = 3.990 | $d_{10}$ = (Variable) | | |
| $r_{11}$ = −200 | $d_{11}$ = 2.2 | $n_{d6}$ = 1.52542 | $v_{d6}$ = 55.78 |
| $r_{12}$ = −9.290 (Aspheric) | $d_{12}$ = (Variable) | | |
| $r_{13}$ = ∞ | $d_{13}$ = 0.77 | $n_{d7}$ = 1.54771 | $v_{d7}$ = 62.84 |
| $r_{14}$ = ∞ | $d_{14}$ = 0.8 | | |
| $r_{15}$ = ∞ | $d_{15}$ = 0.5 | $n_{d8}$ = 1.51633 | $v_{d8}$ = 64.14 |
| $r_{16}$ = ∞ | $d_{16}$ = 0.8 | | |
| $r_{17}$ = ∞(Imaging plane) | | | |

Aspherical Coefficients

2nd surface

K = 0.1965
$A_4 = -4.12 \times 10^{-4}$
$A_6 = 1.98 \times 10^{-6}$
$A_8 = -1.11 \times 10^{-6}$
$A_{10} = 4.47 \times 10^{-8}$
$A_{12} = -1.58 \times 10^{-9}$ 6th surface

K = −0.7733

$A_4 = -2.12 \times 10^{-4}$
$A_6 = 5.30 \times 10^{-6}$
$A_8 = -4.89 \times 10^{-8}$
$A_{10} = 0.00$
$A_{12} = 0.00$ 7th surface K = −0.6596
$A_4 = 6.71 \times 10^{-5}$
$A_6 = 1.08 \times 10^{-5}$
$A_8 = -1.91 \times 10^{-7}$
$A_{10} = 0.00$
$A_{12} = 0.00$ 12th surface K = −0.8453
$A_4 = 3.05 \times 10^{-4}$
$A_6 = -1.03 \times 10^{-5}$
$A_8 = 5.34 \times 10^{-7}$
$A_{10} = -1.39 \times 10^{-8}$
$A_{12} = 0.00$ Zooming Data (∞)

|  | WE | ST | TE |
|---|---|---|---|
| f (mm) | 6.45 | 11 | 18.59 |
| $F_{NO}$ | 2.81 | 3.62 | 5.00 |
| ω (°) | 30.437 | 17.942 | 10.746 |
| $d_4$ | 14.91 | 6.76 | 2.07 |
| $d_{10}$ | 5.32 | 9.49 | 17.01 |
| $d_{12}$ | 1.97 | 2.37 | 3.00 |

Tabulated below are the values of conditions (1), (2) and (3) in the zoom lens according to each example.

| Condition | Example 1 | Example 2 | Example 3 |
|---|---|---|---|
| (1) | 0.00 | −0.02 | 0.44 |
| (2) | 0.91 | 0.91 | 0.91 |
| (3) | 1.32 | 1.32 | 1.41 |

Next, Examples 4, 5, 6, 7 and 8 of the zoom lens according to the second aspect of the invention are explained. FIGS. 7-11 are illustrative in lens arrangement section of Examples 4-8 (a) at the wide-angle ends, (b) in intermediate settings, and (c) at the telephoto ends, respectively, upon focusing on an infinite object point. In FIGS. 7-11, the first lens unit is indicated at G1, the aperture stop at S, the second lens unit at G2, the third lens unit at G3, the plane-parallel plate that forms a low-pass filter applied with a wavelength range-limiting coating for limiting infrared light at F, the cover glass plane-parallel plate for an electronic imaging device at C, and an image plane at I. Note that the cover glass C could be applied on its surface with a wavelength range-limiting multilayer film or, alternatively, it could have a low-pass filter function.

In each of Examples 4-8 shown in FIGS. 7-11, the capital P is indicative of a planar site where the negative lens and the positive lens in the first lens unit G1 are fixed together while a planar portion of the image plane-side surface of the negative lens, which lies beyond its effective diameter and vertical to the optical axis, is in contact with a planar portion of the object-side surface of the positive lens, which lies beyond its effective diameter and vertical to the optical axis.

EXAMPLE 4

Figure 7A:
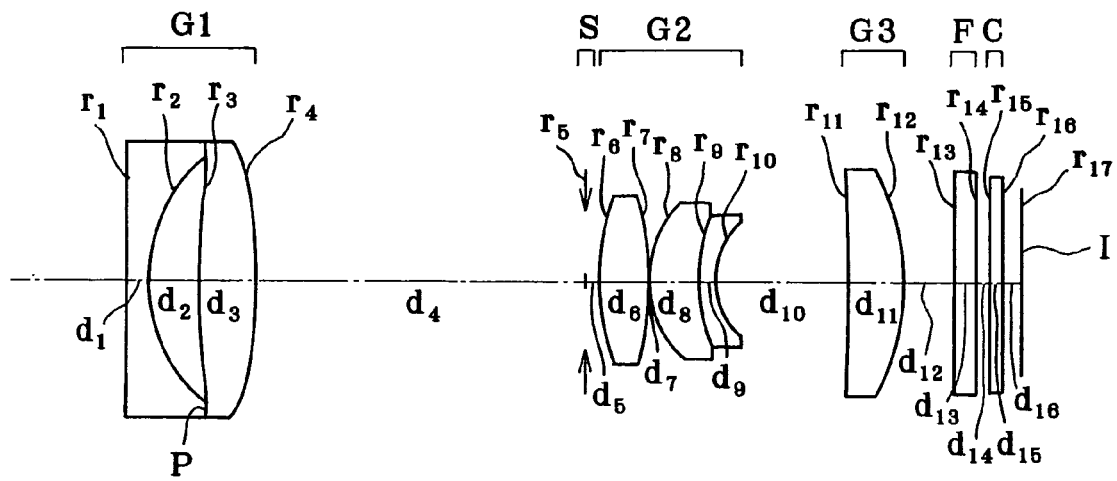
FIG. 7 is a collection of sectional lens views of Example 4 of the inventive zoom lens (a) at the wide-angle end, (b) in an intermediate setting and (c) at the telephoto end upon focusing on an infinite object point.
Figure 7B:
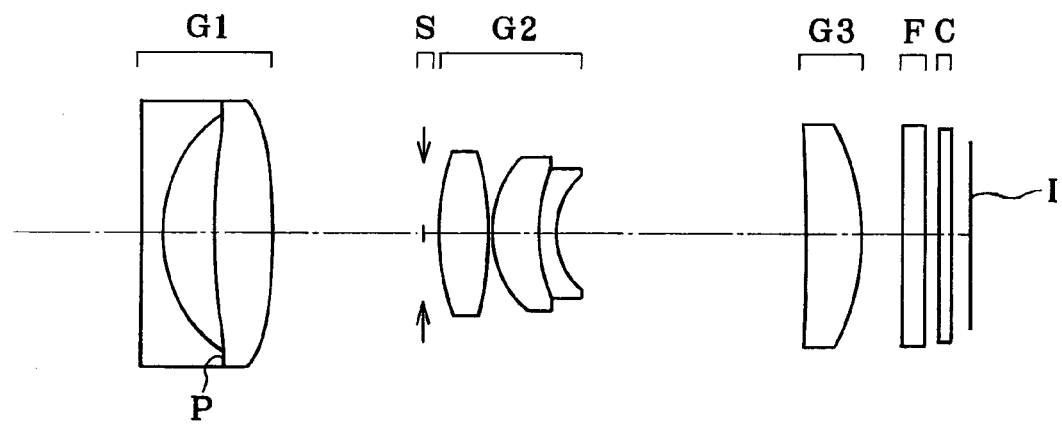
Figure 7C:
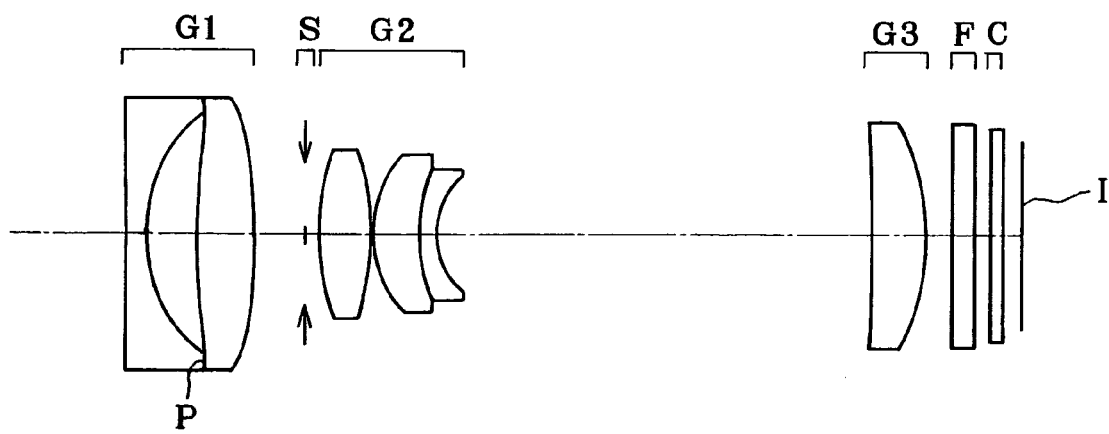

This example is directed to a zoom lens that is made up of, in order from its object side, a first lens unit G1 of negative refracting power, an aperture stop S, a second lens unit G2 of positive refracting power and a third lens unit G3 of positive refracting power, as depicted in FIG. 7. Upon zooming from the wide-angle end to the telephoto end, the first lens unit G1 moves in a concave locus toward the object side and is positioned somewhat nearer to the object side at the telephoto end than at the wide-angle end, the aperture stop S and the second lens unit G2 move together monotonously toward the object side, and the third lens unit G3 moves toward the image plane side.

In order from the object side, the first lens unit G1 is composed of a negative meniscus lens convex on its object side and a double-convex positive lens, wherein they are mutually fixed at a flat site P where a plane of the negative meniscus lens that lies beyond the effective diameter of its image plane-side surface and vertical to the optical axis is in contact with a plane of the double-convex positive lens that lies beyond the effective diameter of its object-side surface and vertical to the optical axis (the plane of the object-side surface of the double-convex positive lens is configured as continuing smoothly to the effective surface); the second lens unit G2 is composed of a double-convex positive lens and a cemented doublet consisting of a positive meniscus lens convex on its object side and a negative meniscus lens convex on its object side; and the third lens unit G3 consists of one positive lens convex on its image plane side.

Five aspheric surfaces are used: two at both surfaces of the double-convex positive lens in the first lens unit G1, two at both surfaces of the double-convex positive lens in the second lens unit G2, and one at the image plane-side surface of the positive meniscus lens in the third lens unit G3.

EXAMPLE 5

Figure 8A:
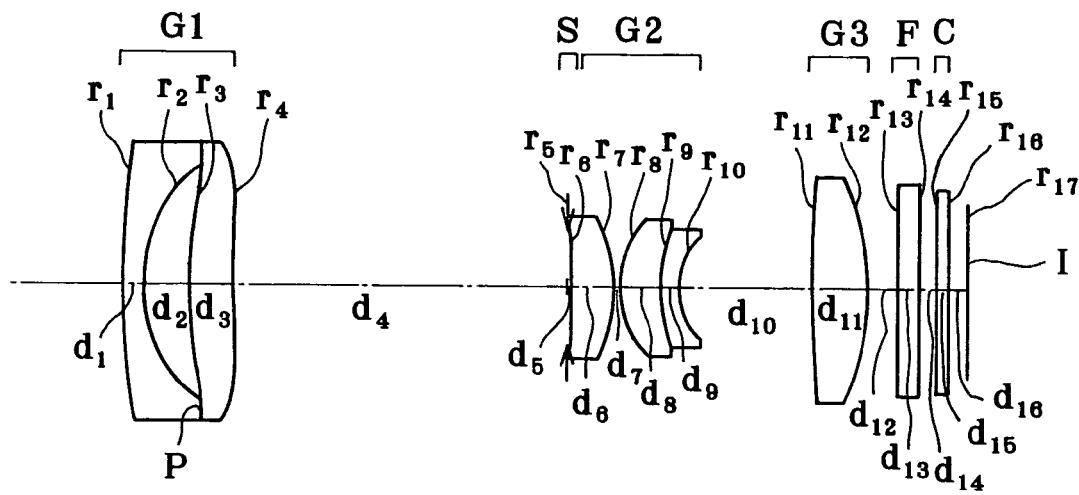
FIG. 8 is illustrative, as in FIG. 1, of Example 5 of the zoom lens according to the invention.
Figure 8B:
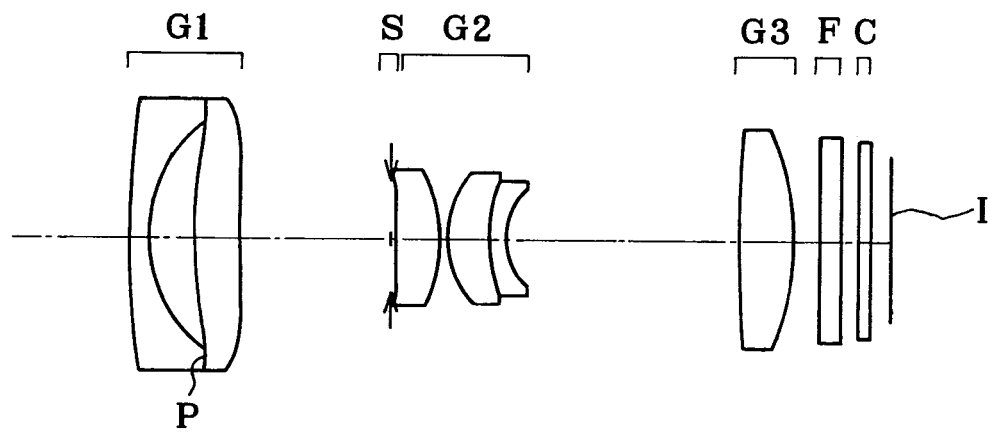
Figure 8C:
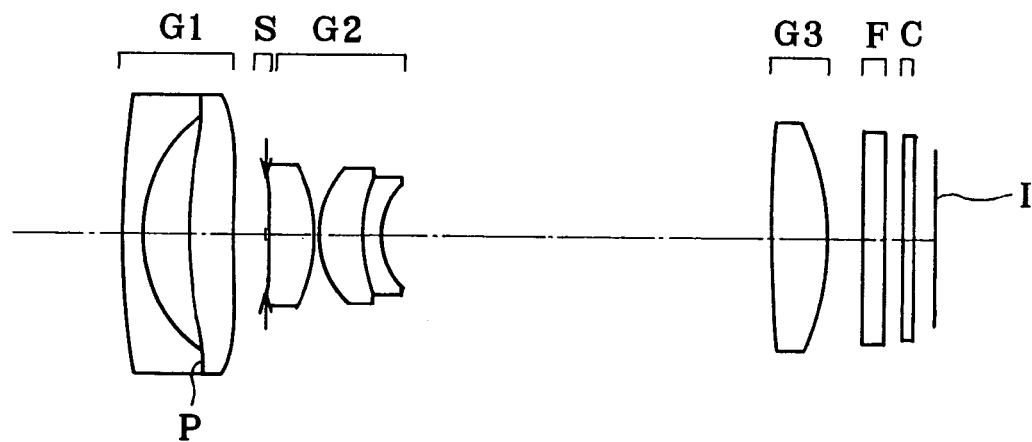

This example is directed to a zoom lens that is made up of, in order from its object side, a first lens unit G1 of negative refracting power, an aperture stop S, a second lens unit G2 of positive refracting power and a third lens unit G3 of positive refracting power, as depicted in FIG. 8. Upon zooming from the wide-angle end to the telephoto end, the first lens unit G1 moves in a concave locus toward the object side and is positioned somewhat nearer to the image plane side at the telephoto end than at the wide-angle end, the aperture stop S and the second lens unit G2 move together monotonously toward the object side, and the third lens unit G3 moves in a convex locus toward the image plane side.

In order from the object side, the first lens unit G1 is composed of a negative meniscus lens convex on its object side and a positive meniscus lens on convex on its object side, wherein they are mutually fixed at a flat site P where a plane of the negative meniscus lens that lies beyond the effective diameter of its image plane-side surface and vertical to the optical axis is in contact with a plane of the positive meniscus lens that lies beyond the effective diameter of its object-side surface and vertical to the optical axis (the plane of the object-side surface of the positive meniscus lens is configured as continuing smoothly to the effective surface); the second lens unit G2 is composed of a double-convex positive lens and a cemented doublet consisting of a positive meniscus lens convex on its object side and a negative meniscus lens convex on its object side; and the third lens unit G3 consists of one positive lens convex on its image plane side.

Five aspheric surfaces are used: two at both surfaces of the positive meniscus lens in the first lens unit G1, two at both surfaces of the double-convex positive lens in the second lens unit G2, and one at the image plane-side surface of the positive meniscus lens in the third lens unit G3.

EXAMPLE 6

Figure 9A:
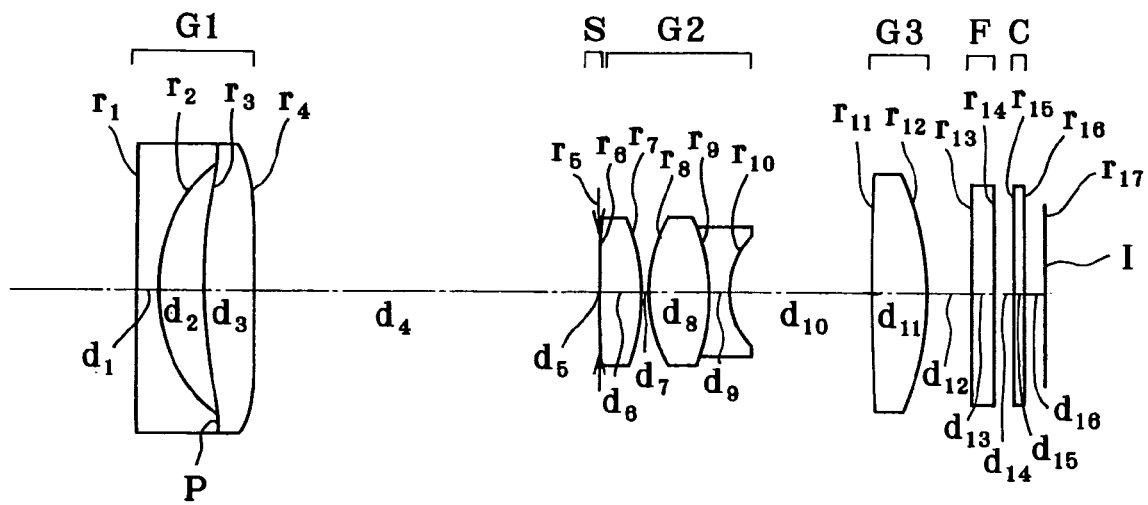
FIG. 9 is illustrative, as in FIG. 1, of Example 6 of the zoom lens according to the invention.
Figure 9B:
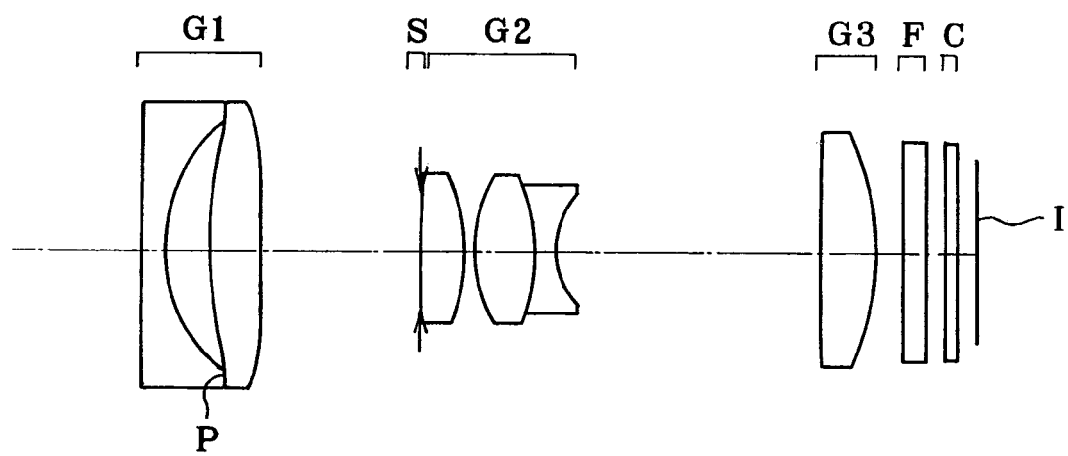
Figure 9C:
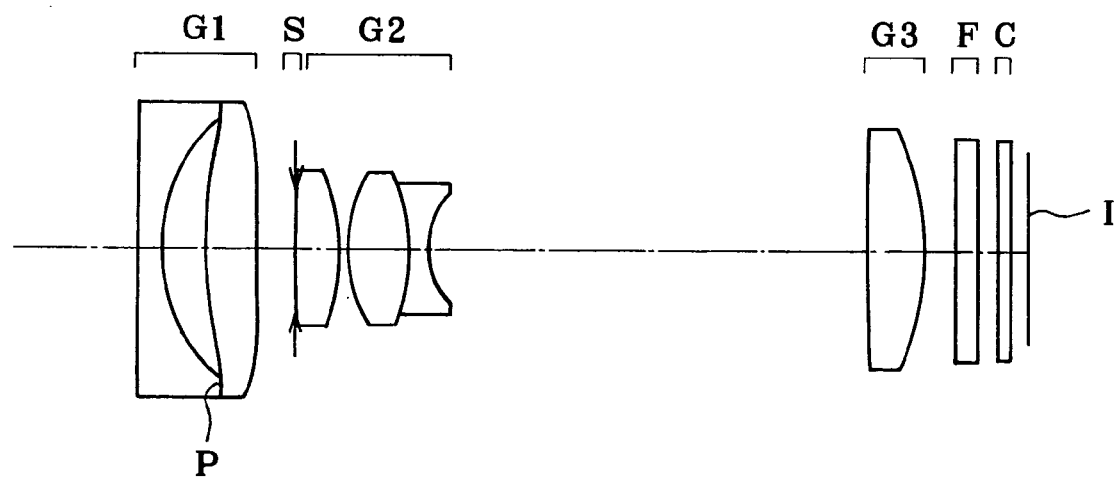

This example is directed to a zoom lens that is made up of, in order from its object side, a first lens unit G1 of negative refracting power, an aperture stop S, a second lens unit G2 of positive refracting power and a third lens unit G3 of positive refracting power, as depicted in FIG. 9. Upon zooming from the wide-angle end to the telephoto end, the first lens unit G1 moves in a concave locus toward the object side and is positioned somewhat nearer to the image plane side at the telephoto end than at the wide-angle end, the aperture stop S and the second lens unit G2 move together monotonously toward the object side, and the third lens unit G3 moves in a convex locus toward the image plane side and positioned somewhat nearer to the image plane side at the telephoto end than at the wide-angle end.

In order from the object side, the first lens unit G1 is composed of a negative meniscus lens convex on its object side and a positive meniscus lens on convex on its object side, wherein they are mutually fixed at a flat site P where a plane of the negative meniscus lens that lies beyond the effective diameter of its image plane-side surface and vertical to the optical axis is in contact with a plane of the positive meniscus lens that lies beyond the effective diameter of its object-side surface and vertical to the optical axis (the plane of the object-side surface of the positive meniscus lens is configured as continuing smoothly to the effective surface); the second lens unit G2 is composed of a double-convex positive lens and a cemented doublet consisting of a double-convex positive lens and a double-concave negative lens; and the third lens unit G3 consists of one positive lens convex on its image plane side.

Five aspheric surfaces are used: two at both surfaces of the positive meniscus lens in the first lens unit G1, two at both surfaces of the single double-convex positive lens in the second lens unit G2, and one at the image plane-side surface of the double-convex positive lens in the third lens unit G3.

EXAMPLE 7

Figure 10A:
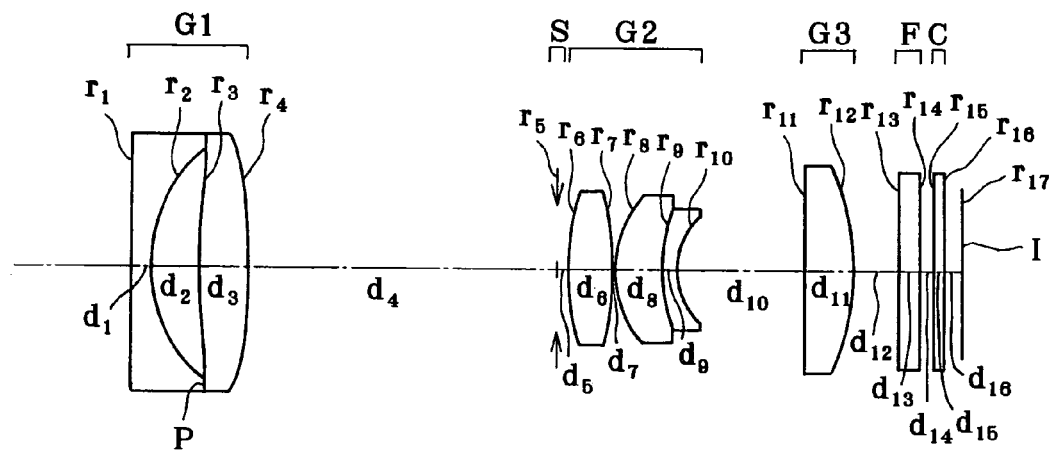
FIG. 10 is illustrative, as in FIG. 1, of Example 7 of the zoom lens according to the invention.
Figure 10B:
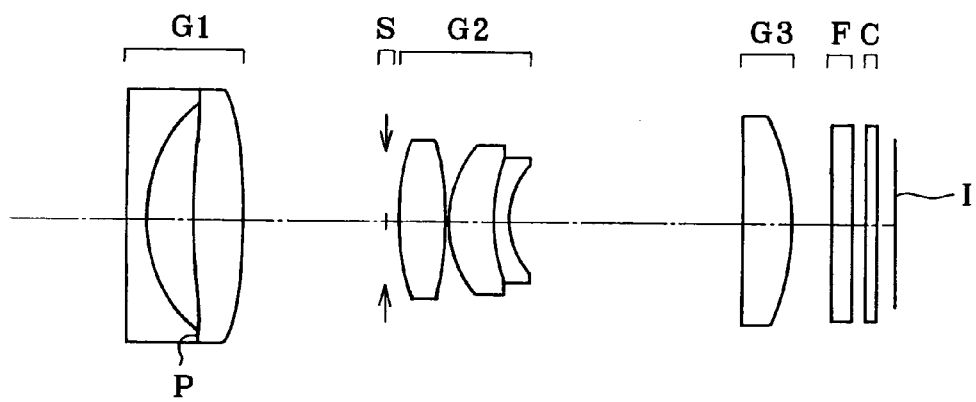
Figure 10C:
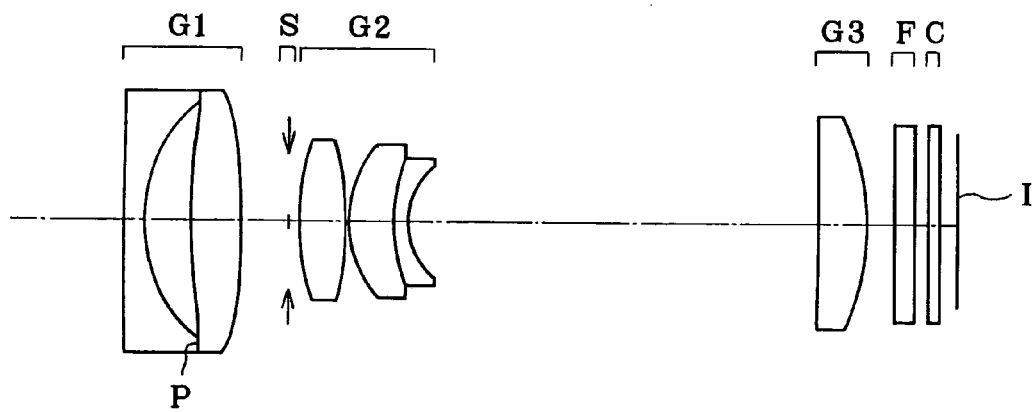

This example is directed to a zoom lens that is made up of, in order from its object side, a first lens unit G1 of negative refracting power, an aperture stop S, a second lens unit G2 of positive refracting power and a third lens unit G3 of positive refracting power, as depicted in FIG. 10. Upon zooming from the wide-angle end to the telephoto end, the first lens unit G1 moves in a concave locus toward the object side and is positioned somewhat nearer to the object side at the telephoto end than at the wide-angle end, the aperture stop S and the second lens unit G2 move together monotonously toward the object side, and the third lens unit G3 moves toward the image plane side.

In order from the object side, the first lens unit G1 is composed of a negative meniscus lens convex on its object side and a double-convex positive lens, wherein they are mutually fixed at a flat site P where a plane of the negative meniscus lens that lies beyond the effective diameter of its image plane-side surface and vertical to the optical axis is in contact with a plane of the double-convex positive lens that lies beyond the effective diameter of its object-side surface and vertical to the optical axis (the plane of the object-side surface of the double-convex positive lens is configured as continuing smoothly to the effective surface); the second lens unit G2 is composed of a double-convex positive lens and a cemented doublet consisting of a positive meniscus lens convex on its object side and a negative meniscus lens convex on its object side; and the third lens unit G3 consists of one positive lens convex on its image plane side.

Five aspheric surfaces are used: two at both surfaces of the double-convex positive lens in the first lens unit G1, two at both surfaces of the double-convex positive lens in the second lens unit G2, and one at the image plane-side surface of the positive meniscus lens in the third lens unit G3.

EXAMPLE 8

Figure 11A:
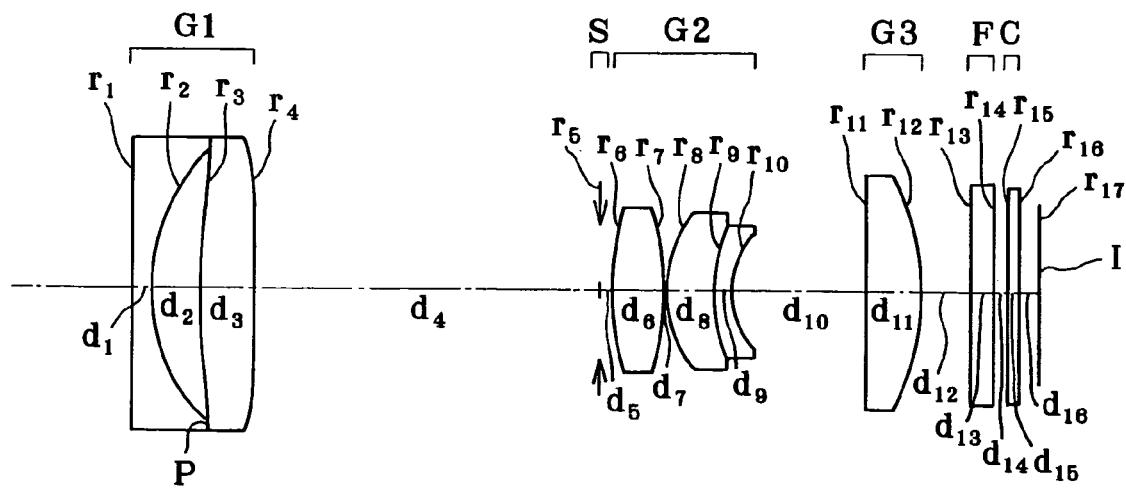
FIG. 11 is illustrative, as in FIG. 1, of Example 8 of the zoom lens according to the invention.
Figure 11B:
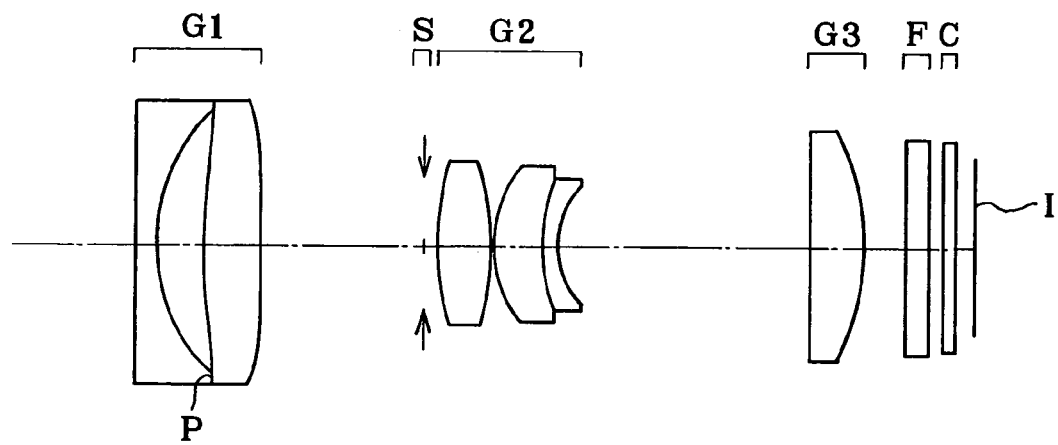
Figure 11C:
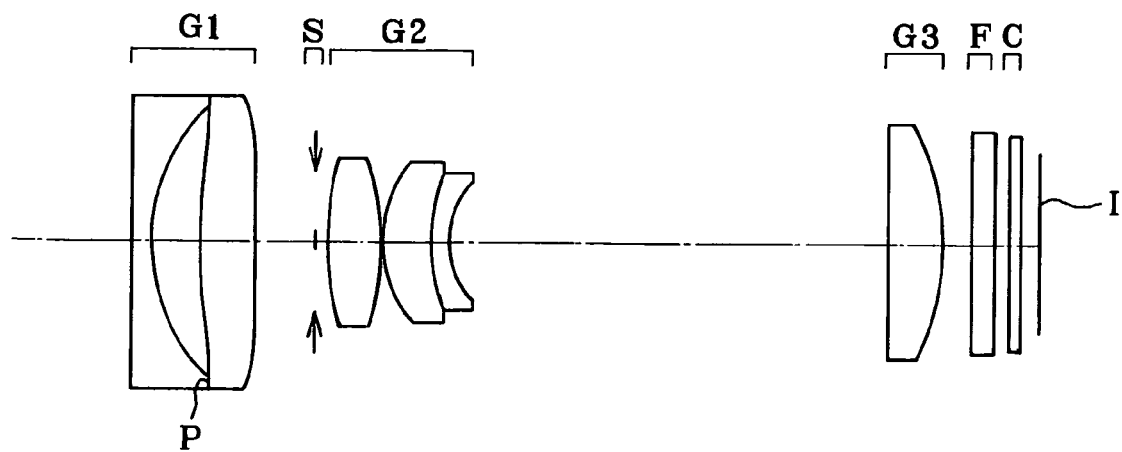
Figure 12A:
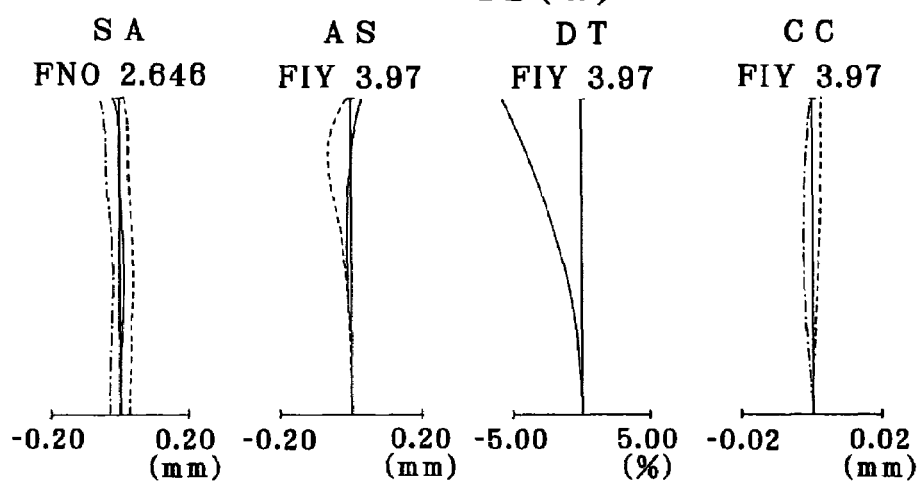
FIG. 12 is a collection of aberration diagrams for Example 4 upon focusing on an infinite object point.
Figure 12B:
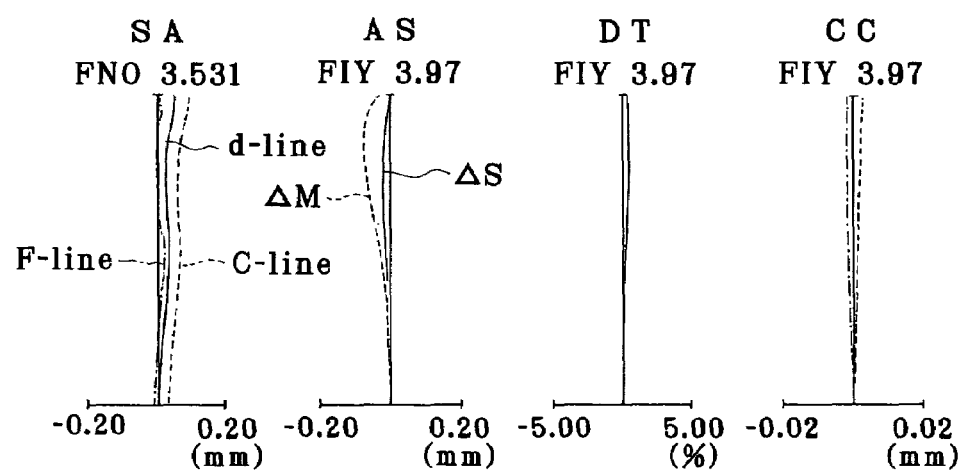
Figure 12C:
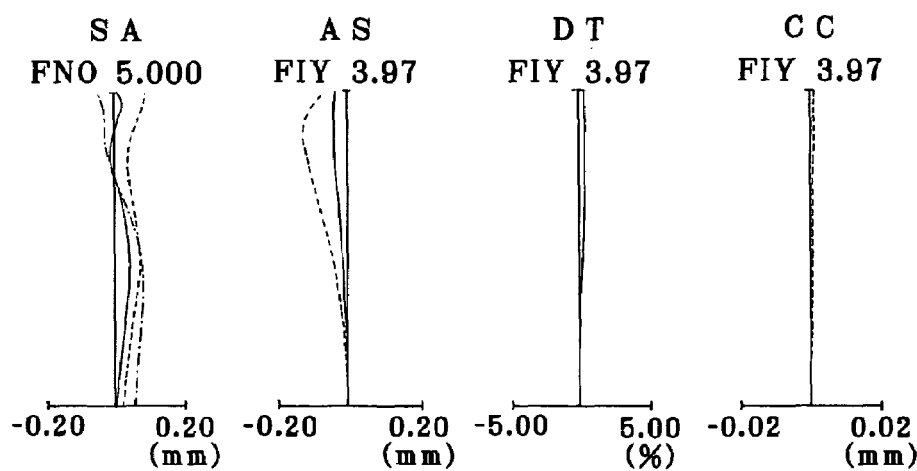
Figure 13A:
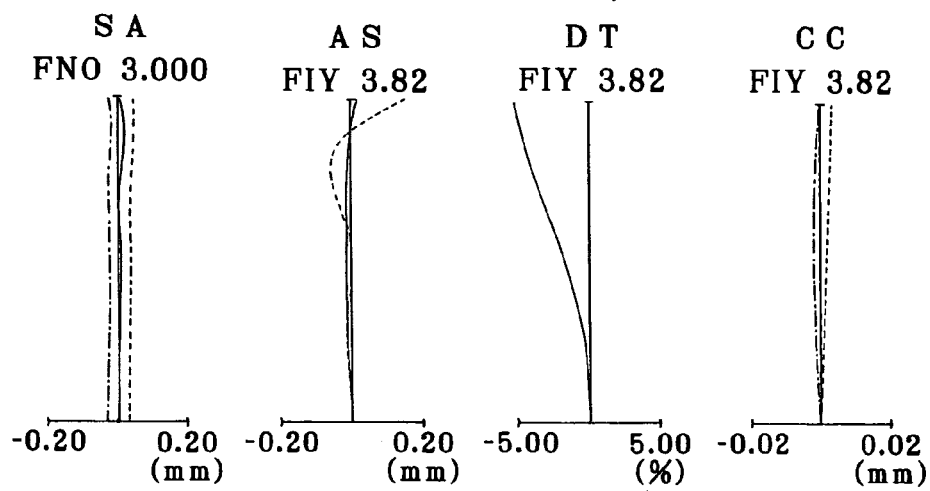
FIG. 13 is a collection of aberration diagrams for Example 5 upon focusing on an infinite object point.
Figure 13B:
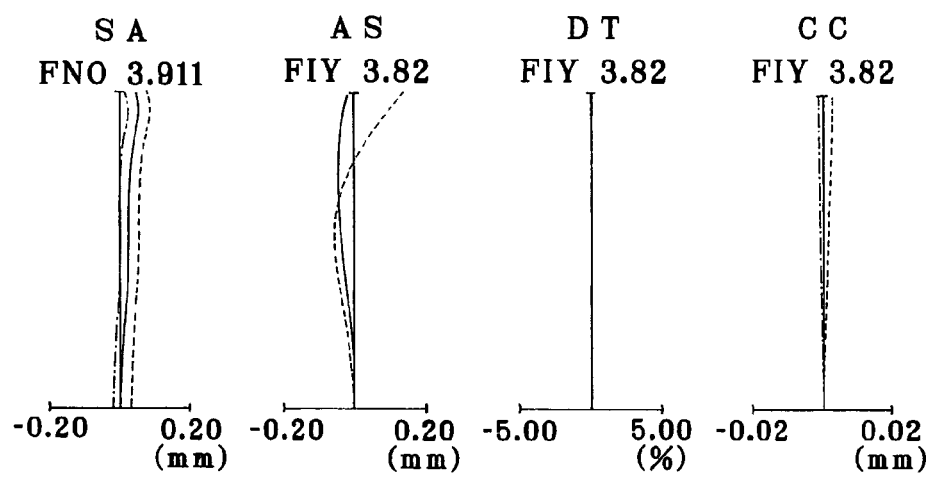
Figure 13C:
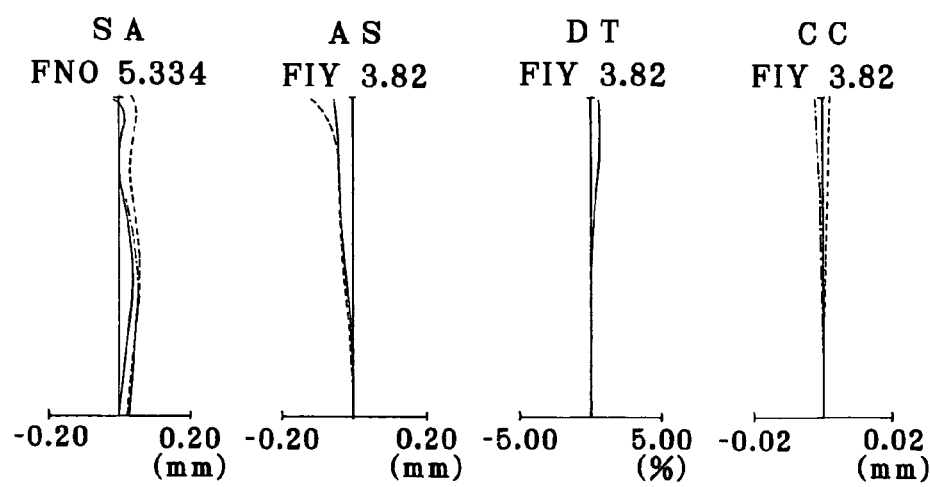
Figure 14A:
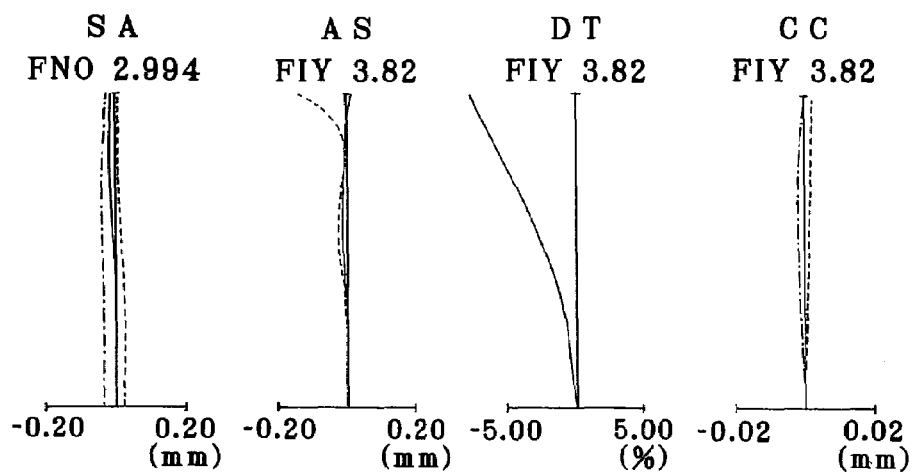
FIG. 14 is a collection of aberration diagrams for Example 6 upon focusing on an infinite object point.
Figure 14B:
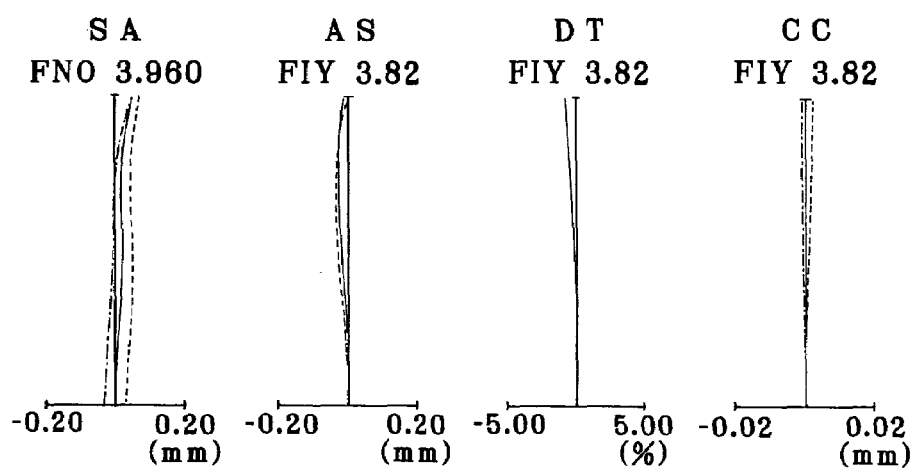
Figure 14C:
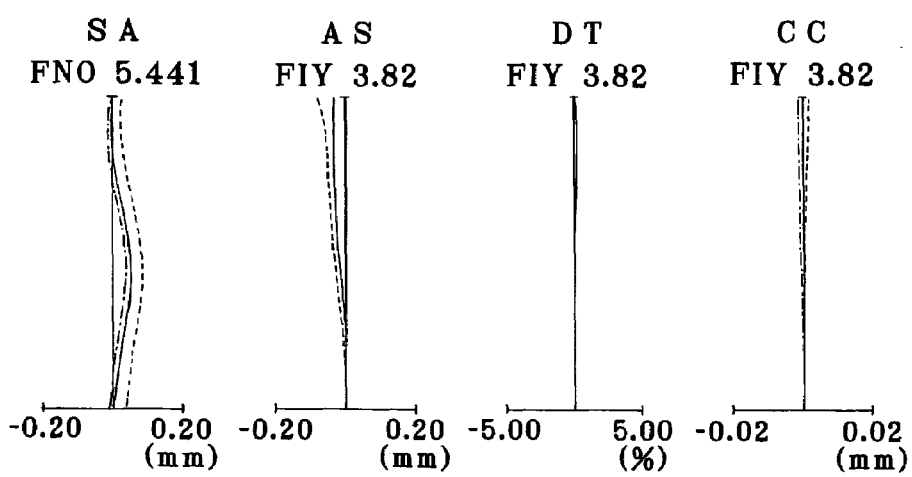
Figure 15A:
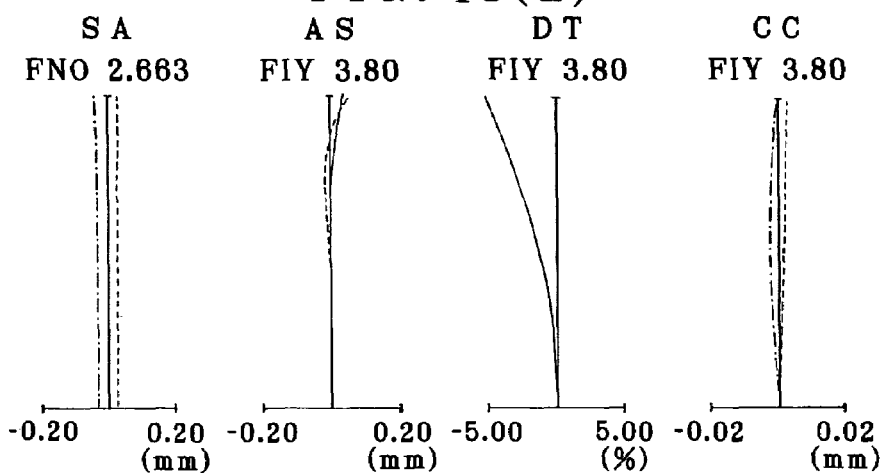
FIG. 15 is a collection of aberration diagrams for Example 7 upon focusing on an infinite object point.
Figure 15B:
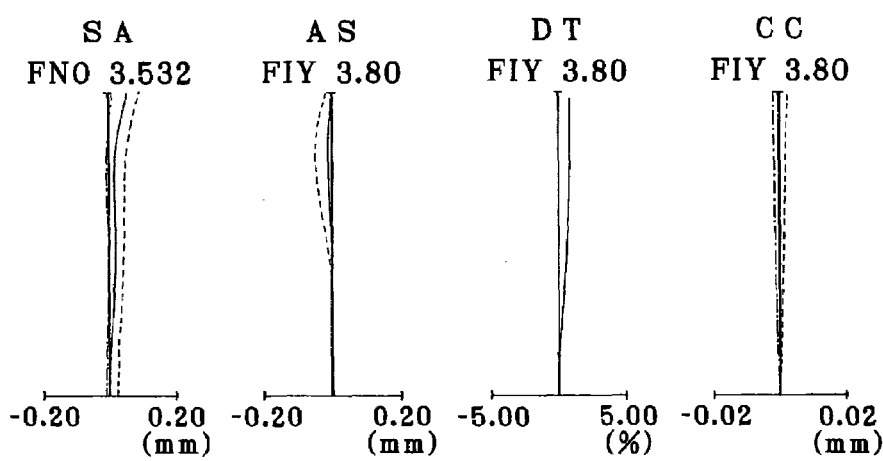
Figure 15C:
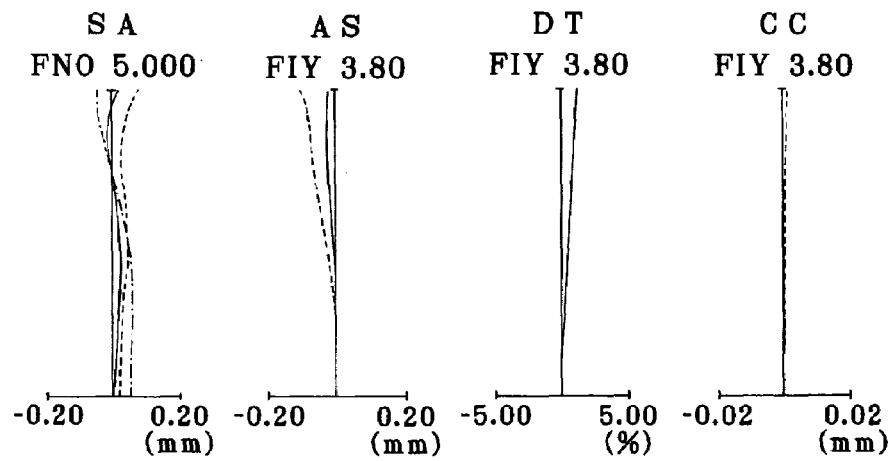
Figure 16A:
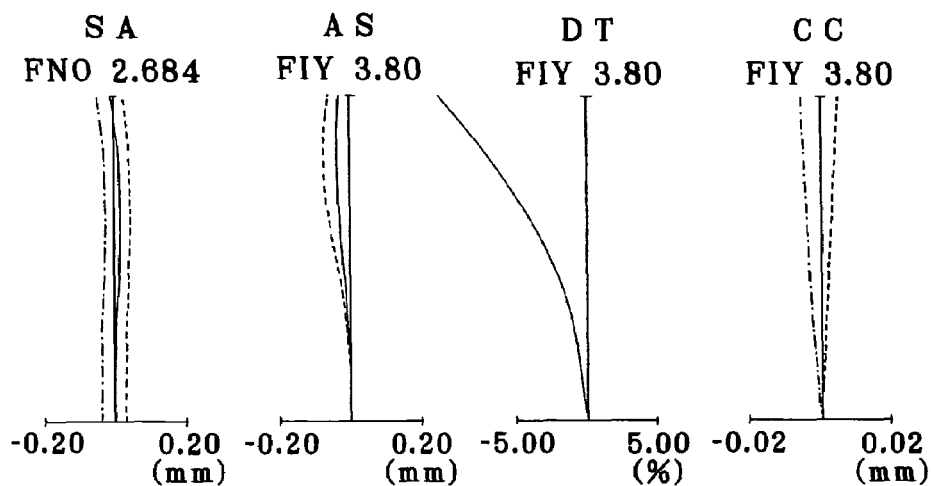
FIG. 16 is a collection of aberration diagrams for Example 8 upon focusing on an infinite object point.
Figure 16B:
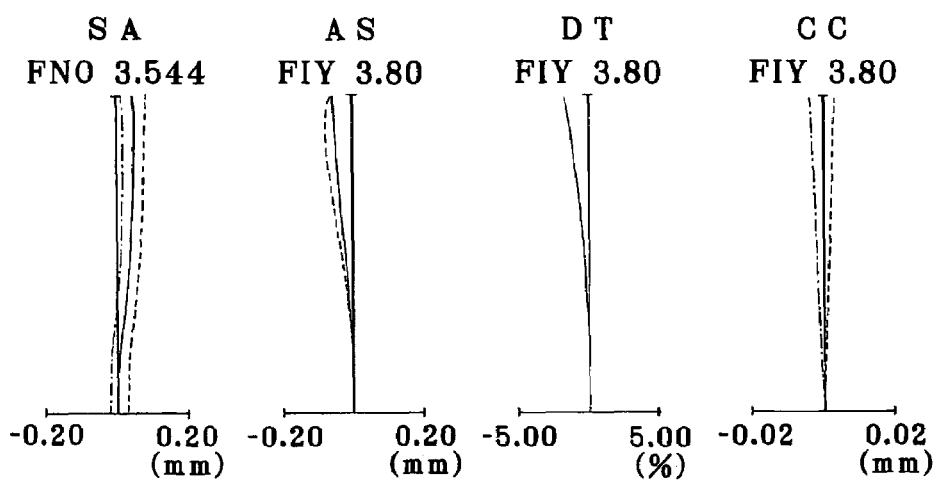
Figure 16C:
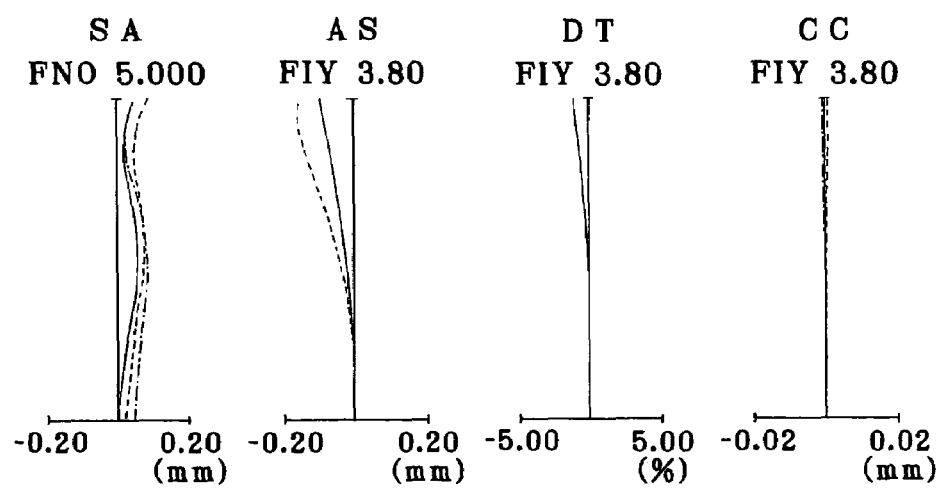

This example is directed to a zoom lens that is made up of, in order from its object side, a first lens unit G1 of negative refracting power, an aperture stop S, a second lens unit G2 of positive refracting power and a third lens unit G3 of positive refracting power, as depicted in FIG. 11. Upon zooming from the wide-angle end to the telephoto end, the first lens unit G1 moves in a concave locus toward the object side and is located at the same position at the telephoto end as that at the wide-angle end, the aperture stop S and the second lens unit G2 move together monotonously toward the object side, and the third lens unit G3 moves toward the image plane side.

In order from the object side, the first lens unit G1 is composed of a negative meniscus lens convex on its object side and a positive meniscus lens convex on its object side, wherein they are mutually fixed at a flat site P where a plane of the negative meniscus lens that lies beyond the effective diameter of its image plane-side surface and vertical to the optical axis is in contact with a plane of the positive meniscus lens that lies beyond the effective diameter of its object-side surface and vertical to the optical axis (the plane of the object-side surface of the positive meniscus lens is configured as continuing smoothly to the effective surface); the second lens unit G2 is composed of a double-convex positive lens and a cemented doublet consisting of a positive meniscus lens convex on its object side and a negative meniscus lens convex on its object side; and the third lens unit G3 consists of one double-convex positive lens.

Five aspheric surfaces are used: two at both surfaces of the positive meniscus lens in the first lens unit G1, two at both surfaces of the double-convex positive lens in the second lens unit G2, and one at the image plane-side surface of the double-convex position lens in the third lens unit G3.

Enumerated below are the numerical data in each of the above Examples 4-8. The symbols used hereinafter but not hereinbefore have the following meanings:

f: focal length of the zoom optical system, $F_{NO}$: F-number,

ω: half angle of view,

WE: wide-angle end,

ST: intermediate setting,

TE: telephoto end, $r_1$, $r_2$, etc.: radius of curvature of each lens surface, $d_1$, $d_2$, etc.: space between adjacent lens surfaces, $n_{d1}$, $n_{d2}$, etc.: d-line refractive index of each lens, and $V_{d1}$, $V_{d2}$, etc.: Abbe constant of each lens. Note that aspheric surface configuration is given by the following formula provided that x is indicative of an optical axis with the direction of travel of light taken as positive and y is indicative of a direction orthogonal to the optical axis.

$$x = (y^2/r)/\left[1 + \{1-(K+1)(y/r)^2\}^{1/2}\right] + A_4 y^4 + A_6 y^6 + A_8 y^8 + A_{10} y^{10} + A_{12} y^{12}$$

where r is a paraxial radius of curvature, K is a conical coefficient, and A4, A6, A8, A10 and A12 are the $4^{th}$-, $6^{th}$-, $8^{th}$-, $10^{th}$- and $12^{th}$-order aspherical coefficients, respectively.

EXAMPLE 4

| | | | |
|---|---|---|---|
| $r_1$ = 600.000 | $d_1$ = 0.90 | $n_{d1}$ = 1.83481 | $v_{d1}$ = 42.71 |
| $r_2$ = 6.464 | $d_2$ = 2.09 | | |
| $r_3$ = 25.787 (Aspheric) | $d_3$ = 2.29 | $n_{d2}$ = 1.82114 | $v_{d2}$ = 24.06 |
| $r_4$ = −72.532 (Aspheric) | $d_4$ = (Variable) | | |
| $r_5$ = ∞ (Stop) | $d_5$ = 0.52 | | |
| $r_6$ = 9.186 (Aspheric) | $d_6$ = 2.10 | $n_{d3}$ = 1.58913 | $v_{d3}$ = 61.25 |
| $r_7$ = −16.117 (Aspheric) | $d_7$ = 0.10 | | |
| $r_8$ = 4.700 | $d_8$ = 2.01 | $n_{d4}$ = 1.60311 | $v_{d4}$ = 60.64 |
| $r_9$ = 7.781 | $d_9$ = 0.70 | $n_{d5}$ = 1.84666 | $v_{d5}$ = 23.78 |
| $r_{10}$ = 3.277 | $d_{10}$ = (Variable) | | |
| $r_{11}$ = −76.478 | $d_{11}$ = 2.30 | $n_{d6}$ = 1.52542 | $v_{d6}$ = 55.78 |
| $r_{12}$ = −8.749 (Aspheric) | $d_{12}$ = (Variable) | | |
| $r_{13}$ = ∞ | $d_{13}$ = 0.96 | $n_{d7}$ = 1.54771 | $v_{d7}$ = 62.84 |
| $r_{14}$ = ∞ | $d_{14}$ = 0.60 | | |
| $r_{15}$ = ∞ | $d_{15}$ = 0.50 | $n_{d8}$ = 1.51633 | $v_{d8}$ = 64.14 |
| $r_{16}$ = ∞ | $d_{16}$ = 0.80 | | |
| $r_{17}$ = ∞ (Image plane) | | | |

Aspherical Coefficients

3rd surface

K = 4.269
$A_4$ = −1.87599 × $10^{-4}$
$A_6$ = 7.64679 × $10^{-7}$
$A_8$ = −1.59780 × $10^{-7}$
$A_{10}$ = −3.77931 × $10^{-9}$

4th surface

K = 0.000
$A_4$ = −4.24687 × $10^{-4}$
$A_6$ = 2.52348 × $10^{-6}$
$A_8$ = −7.16449 × $10^{-7}$
$A_{10}$ = 2.59036 × $10^{-8}$
$A_{12}$ = −5.82742 × $10^{-10}$

6th surface

K = 2.867
$A_4$ = −8.17109 × $10^{-4}$
$A_6$ = −2.79925 × $10^{-5}$
$A_8$ = −1.75116 × $10^{-6}$
$A_{10}$ = 0

7th surface

K = 8.841
$A_4$ = 3.16055 × $10^{-4}$
$A_6$ = −2.51075 × $10^{-5}$
$A_8$ = 1.10436 × $10^{-7}$
$A_{10}$ = 0

-continued

12th surface

K = 0.000
$A_4 = 5.95690 \times 10^{-4}$
$A_6 = -1.46363 \times 10^{-5}$
$A_8 = 2.97205 \times 10^{-7}$
$A_{10} = 1.48953 \times 10^{-9}$ Zooming Data (∞)

|  | WE | ST | TE |
|---|---|---|---|
| f (mm) | 6.450 | 11.020 | 18.590 |
| $F_{NO}$ | 2.65 | 3.53 | 5.00 |
| ω (°) | 31.593 | 18.767 | 11.388 |
| $d_4$ | 13.63 | 6.33 | 2.10 |
| $d_{10}$ | 5.48 | 10.41 | 18.01 |
| $d_{12}$ | 1.96 | 1.57 | 0.98 |

EXAMPLE 5

| $r_1 = 40.804$ | $d_1 = 0.90$ | $n_{d1} = 1.80400$ | $\nu_{d1} = 46.57$ |
|---|---|---|---|
| $r_2 = 6.218$ | $d_2 = 1.95$ | | |
| $r_3 = 15.243$ (Aspheric) | $d_3 = 2.00$ | $n_{d2} = 1.84666$ | $\nu_{d2} = 23.78$ |
| $r_4 = 43.725$ (Aspheric) | $d_4$ = (Variable) | | |
| $r_5 = \infty$ (Stop) | $d_5 = 0.10$ | | |
| $r_6 = 45.000$ (Aspheric) | $d_6 = 2.00$ | $n_{d3} = 1.58313$ | $\nu_{d3} = 59.38$ |
| $r_7 = -7.732$ (Aspheric) | $d_7 = 0.20$ | | |
| $r_8 = 4.026$ | $d_8 = 1.80$ | $n_{d4} = 1.60311$ | $\nu_{d4} = 60.64$ |
| $r_9 = 6.815$ | $d_9 = 0.80$ | $n_{d5} = 1.84666$ | $\nu_{d5} = 23.78$ |
| $r_{10} = 3.066$ | $d_{10}$ = (Variable) | | |
| $r_{11} = 60.253$ | $d_{11} = 2.51$ | $n_{d6} = 1.52542$ | $\nu_{d6} = 55.78$ |
| $r_{12} = -10.285$ (Aspheric) | $d_{12}$ = (Variable) | | |
| $r_{13} = \infty$ | $d_{13} = 0.96$ | $n_{d7} = 1.54771$ | $\nu_{d7} = 62.84$ |
| $r_{14} = \infty$ | $d_{14} = 0.80$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.80$ | | |
| $r_{17} = \infty$ (Image plane) | | | |

Aspherical Coefficients

3rd surface

K = −0.838
$A_4 = -6.54143 \times 10^{-5}$
$A_6 = -3.82957 \times 10^{-5}$
$A_8 = 2.14452 \times 10^{-6}$
$A_{10} = -4.23358 \times 10^{-8}$ 4th surface K = 0.000
$A_4 = -3.73404 \times 10^{-4}$
$A_6 = -4.02332 \times 10^{-5}$
$A_8 = 2.38711 \times 10^{-6}$
$A_{10} = -5.34810 \times 10^{-8}$ 6th surface K = −4.773
$A_4 = -1.63350 \times 10^{-3}$
$A_6 = -6.65602 \times 10^{-5}$
$A_8 = -2.50994 \times 10^{-6}$
$A_{10} = 0$ -continued 7th surface K = 2.932
$A_4 = -5.94103 \times 10^{-5}$
$A_6 = -2.65976 \times 10^{-5}$
$A_8 = 2.33540 \times 10^{-6}$
$A_{10} = 0$ 12th surface K = −0.704
$A_4 = 1.73265 \times 10^{-4}$
$A_6 = 1.85462 \times 10^{-6}$
$A_8 = -1.45809 \times 10^{-7}$
$A_{10} = 0$ Zooming Data (∞)

|  | WE | ST | TE |
|---|---|---|---|
| f (mm) | 6.460 | 11.000 | 18.590 |
| $F_{NO}$ | 3.00 | 3.91 | 5.33 |
| ω (°) | 30.396 | 18.131 | 10.907 |
| $d_4$ | 14.25 | 6.40 | 1.40 |
| $d_{10}$ | 5.76 | 10.11 | 16.81 |
| $d_{12}$ | 1.18 | 1.00 | 1.56 |

EXAMPLE 6

| $r_1 = 300.050$ | $d_1 = 0.90$ | $n_{d1} = 1.80400$ | $\nu_{d1} = 46.57$ |
|---|---|---|---|
| $r_2 = 6.450$ | $d_2 = 1.80$ | | |
| $r_3 = 15.428$ (Aspheric) | $d_3 = 2.00$ | $n_{d2} = 1.82114$ | $\nu_{d2} = 24.06$ |
| $r_4 = 90.475$ (Aspheric) | $d_4$ = (Variable) | | |
| $r_5 = \infty$ (Stop) | $d_5 = 0.00$ | | |
| $r_6 = 31.500$ (Aspheric) | $d_6 = 1.80$ | $n_{d3} = 1.48749$ | $\nu_{d3} = 70.44$ |
| $r_7 = -8.912$ (Aspheric) | $d_7 = 0.20$ | | |
| $r_8 = 5.451$ | $d_8 = 2.51$ | $n_{d4} = 1.67790$ | $\nu_{d4} = 55.34$ |
| $r_9 = -8.486$ | $d_9 = 0.80$ | $n_{d5} = 1.59270$ | $\nu_{d5} = 35.31$ |
| $r_{10} = 3.360$ | $d_{10}$ = (Variable) | | |
| $r_{11} = 221.891$ | $d_{11} = 2.30$ | $n_{d6} = 1.52542$ | $\nu_{d6} = 55.78$ |
| $r_{12} = -10.272$ (Aspheric) | $d_{12}$ = (Variable) | | |
| $r_{13} = \infty$ | $d_{13} = 0.96$ | $n_{d7} = 1.54771$ | $\nu_{d7} = 62.84$ |
| $r_{14} = \infty$ | $d_{14} = 0.80$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.76$ | | |
| $r_{17} = \infty$ (Image plane) | | | |

Aspherical Coefficients

3rd surface

K = −0.140
$A_4 = -1.53377 \times 10^{-4}$
$A_6 = -4.69559 \times 10^{-6}$
$A_8 = -3.81572 \times 10^{-7}$
$A_{10} = 1.21558 \times 10^{-8}$ 4th surface K = 0.000
$A_4 = -3.83875 \times 10^{-4}$
$A_6 = -1.32313 \times 10^{-5}$
$A_8 = 1.05382 \times 10^{-7}$
$A_{10} = -1.33184 \times 10^{-9}$ -continued 6th surface K = −222.219
$A_4 = -4.46470 \times 10^{-4}$
$A_6 = -1.56452 \times 10^{-4}$
$A_8 = 4.01062 \times 10^{-6}$
$A_{10} = 0$ 7th surface K = 2.239
$A_4 = -2.75746 \times 10^{-4}$
$A_6 = -6.35509 \times 10^{-5}$
$A_8 = 2.00725 \times 10^{-6}$
$A_{10} = 0$ 12th surface K = −1.266
$A_4 = 1.46615 \times 10^{-4}$
$A_6 = -1.81005 \times 10^{-6}$
$A_8 = -4.95228 \times 10^{-8}$
$A_{10} = 0$ Zooming Data (∞)

|  | WE | ST | TE |
|---|---|---|---|
| f (mm) | 6.447 | 10.973 | 18.553 |
| $F_{NO}$ | 2.99 | 3.96 | 5.44 |
| ω (°) | 31.014 | 18.295 | 10.961 |
| $d_4$ | 13.53 | 6.29 | 1.50 |
| $d_{10}$ | 5.50 | 10.43 | 17.27 |
| $d_{12}$ | 1.67 | 1.00 | 1.17 |

EXAMPLE 7

| $r_1 = 268.142$ | $d_1 = 0.90$ | $n_{d1} = 1.83481$ | $\nu_{d1} = 42.71$ |
|---|---|---|---|
| $r_2 = 6.466$ | $d_2 = 2.05$ | | |
| $r_3 = 23.852$ (Aspheric) | $d_3 = 2.25$ | $n_{d2} = 1.84666$ | $\nu_{d2} = 23.78$ |
| $r_4 = -115.636$ (Aspheric) | $d_4$ = (Variable) | | |
| $r_5 = \infty$ (Stop) | $d_5 = 0.52$ | | |
| $r_6 = 9.836$ (Aspheric) | $d_6 = 2.10$ | $n_{d3} = 1.58913$ | $\nu_{d3} = 61.14$ |
| $r_7 = -14.876$ (Aspheric) | $d_7 = 0.10$ | | |
| $r_8 = 4.700$ | $d_8 = 2.01$ | $n_{d4} = 1.60311$ | $\nu_{d4} = 60.64$ |
| $r_9 = 7.840$ | $d_9 = 0.70$ | $n_{d5} = 1.84666$ | $\nu_{d5} = 23.78$ |
| $r_{10} = 3.321$ | $d_{10}$ = (Variable) | | |
| $r_{11} = -234.912$ | $d_{11} = 2.23$ | $n_{d6} = 1.52542$ | $\nu_{d6} = 55.78$ |
| $r_{12} = -9.384$ (Aspheric) | $d_{12}$ = (Variable) | | |
| $r_{13} = \infty$ | $d_{13} = 0.96$ | $n_{d7} = 1.54771$ | $\nu_{d7} = 62.84$ |
| $r_{14} = \infty$ | $d_{14} = 0.60$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.80$ | | |
| $r_{17} = \infty$ (Image plane) | | | |

Aspherical Coefficients

3rd surface

K = 4.986
$A_4 = -1.57553 \times 10^{-4}$
$A_6 = -2.56359 \times 10^{-6}$
$A_8 = -2.06881 \times 10^{-7}$
$A_{10} = -1.96672 \times 10^{-9}$ -continued 4th surface K = 0.000
$A_4 = -3.80671 \times 10^{-4}$
$A_6 = -3.35620 \times 10^{-7}$
$A_8 = -7.60214 \times 10^{-7}$
$A_{10} = 2.91748 \times 10^{-8}$
$A_{12} = -6.16124 \times 10^{-10}$ 6th surface K = 2.683
$A_4 = -7.48363 \times 10^{-4}$
$A_6 = -3.47002 \times 10^{-5}$
$A_8 = -1.28246 \times 10^{-6}$
$A_{10} = 0$ 7th surface K = 5.711
$A_4 = 1.87600 \times 10^{-4}$
$A_6 = -3.25799 \times 10^{-5}$
$A_8 = -5.16557 \times 10^{-8}$
$A_{10} = 0$ 12th surface K = 0.000
$A_4 = 6.90315 \times 10^{-4}$
$A_6 = -3.12977 \times 10^{-5}$
$A_8 = 1.51283 \times 10^{-6}$
$A_{10} = -3.12539 \times 10^{-8}$ Zooming Data (∞)

|  | WE | ST | TE |
|---|---|---|---|
| f (mm) | 6.450 | 11.000 | 18.590 |
| $F_{NO}$ | 2.66 | 3.53 | 5.00 |
| ω (°) | 30.383 | 17.966 | 10.838 |
| $d_4$ | 13.70 | 6.34 | 2.10 |
| $d_{10}$ | 5.60 | 10.43 | 18.08 |
| $d_{12}$ | 1.90 | 1.60 | 1.04 |

EXAMPLE 8

| $r_1 = 52.387$ | $d_1 = 0.80$ | $n_{d1} = 1.83481$ | $\nu_{d1} = 42.71$ |
|---|---|---|---|
| $r_2 = 6.600$ | $d_2 = 1.90$ | | |
| $r_3 = 18.650$ (Aspheric) | $d_3 = 2.25$ | $n_{d2} = 2.00170$ | $\nu_{d2} = 20.65$ |
| $r_4 = 49.640$ (Aspheric) | $d_4$ = (Variable) | | |
| $r_5 = \infty$ (Stop) | $d_5 = 0.52$ | | |
| $r_6 = 12.288$ (Aspheric) | $d_6 = 2.10$ | $n_{d3} = 1.58913$ | $\nu_{d3} = 61.24$ |
| $r_7 = -12.431$ (Aspheric) | $d_7 = 0.10$ | | |
| $r_8 = 4.700$ | $d_8 = 2.00$ | $n_{d4} = 1.60311$ | $\nu_{d4} = 60.64$ |
| $r_9 = 7.433$ | $d_9 = 0.70$ | $n_{d5} = 1.84666$ | $\nu_{d5} = 23.78$ |
| $r_{10} = 3.471$ | $d_{10}$ = (Variable) | | |
| $r_{11} = 590.423$ | $d_{11} = 2.20$ | $n_{d6} = 1.52542$ | $\nu_{d6} = 55.78$ |
| $r_{12} = -9.819$ (Aspheric) | $d_{12}$ = (Variable) | | |
| $r_{13} = \infty$ | $d_{13} = 0.96$ | $n_{d7} = 1.54771$ | $\nu_{d7} = 62.84$ |
| $r_{14} = \infty$ | $d_{14} = 0.60$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.79$ | | |
| $r_{17} = \infty$ (Image plane) | | | |

Aspherical Coefficients

3rd surface

K = −17.705
$A_4 = -7.27267 \times 10^{-5}$
$A_6 = -8.24112 \times 10^{-6}$
$A_8 = 7.94390 \times 10^{-8}$
$A_{10} = 8.88090 \times 10^{-10}$ 4th surface K = 0.000
$A_4 = -6.44514 \times 10^{-4}$
$A_6 = 1.98569 \times 10^{-6}$
$A_8 = -2.56686 \times 10^{-7}$
$A_{10} = 1.44795 \times 10^{-8}$
$A_{12} = -3.41244 \times 10^{-10}$ 6th surface K = 2.651
$A_4 = -4.50048 \times 10^{-4}$
$A_6 = -8.11323 \times 10^{-5}$
$A_8 = 2.50010 \times 10^{-6}$
$A_{10} = 0$ 7th surface K = 9.035
$A_4 = 7.46290 \times 10^{-4}$
$A_6 = -7.81287 \times 10^{-5}$
$A_8 = 5.71733 \times 10^{-6}$
$A_{10} = 0$ 12th surface K = 0.000
$A_4 = 3.35417 \times 10^{-4}$
$A_6 = -7.88925 \times 10^{-6}$
$A_8 = 2.00340 \times 10^{-7}$
$A_{10} = -8.39908 \times 10^{-10}$ Zooming Data (∞)

|  | WE | ST | TE |
|---|---|---|---|
| f (mm) | 6.450 | 11.000 | 18.590 |
| $F_{NO}$ | 2.69 | 3.55 | 5.00 |
| ω (°) | 31.677 | 18.372 | 11.052 |
| $d_4$ | 14.08 | 6.77 | 2.59 |
| $d_{10}$ | 5.56 | 10.33 | 17.91 |
| $d_{12}$ | 1.94 | 1.65 | 1.08 |

FIGS. 12-16 are indicative of aberrations of Examples 4-8 upon focusing on an infinite object point. In these aberration diagrams, (a), (b) and (c) are indicative of spherical aberrations (SA), astigmatisms (AS), distortions (DT) and chromatic aberrations of magnification at the wide-angle ends, in intermediate settings, and at the telephoto ends, respectively. Throughout the FIGS. 12-16, "FIY" stands for the maximum image height.

Tabulate below are the values of the angle of view, conditions (4-1) to (6-1), $f_{1G}$ and $f_{2G}$ in the respective examples.

| Condition | Ex. 1 | Ex. 2 | Ex. 3 | Ex. 4 | Ex. 5 |
|---|---|---|---|---|---|
| (4-1) | 1.83481 | 1.80400 | 1.80400 | 1.83481 | 1.83481 |
| (4-2) | 1.82114 | 1.84666 | 1.82114 | 1.84666 | 2.00170 |
| (A) | 0.76 | 1.72 | 1.15 | 0.76 | 1.32 |
| (5) | 0.11 | 0.12 | 0.12 | 0.11 | 0.11 |
| (5-1) | 0.064 | 0.074 | 0.074 | 0.064 | 0.065 |

-continued

| Condition | Ex. 1 | Ex. 2 | Ex. 3 | Ex. 4 | Ex. 5 |
|---|---|---|---|---|---|
| (6) | 1.00 | 0.96 | 1.00 | 1.00 | 1.02 |
| (6-1) | −0.46 | −0.41 | −0.44 | −0.46 | −0.46 |
| $f_{1G}$ | −13.93 | −15.21 | −14.58 | −14.03 | −14.20 |
| $f_{2G}$ | 10.89 | 10.76 | 10.75 | 10.9 | 10.78 |

Figure 17:
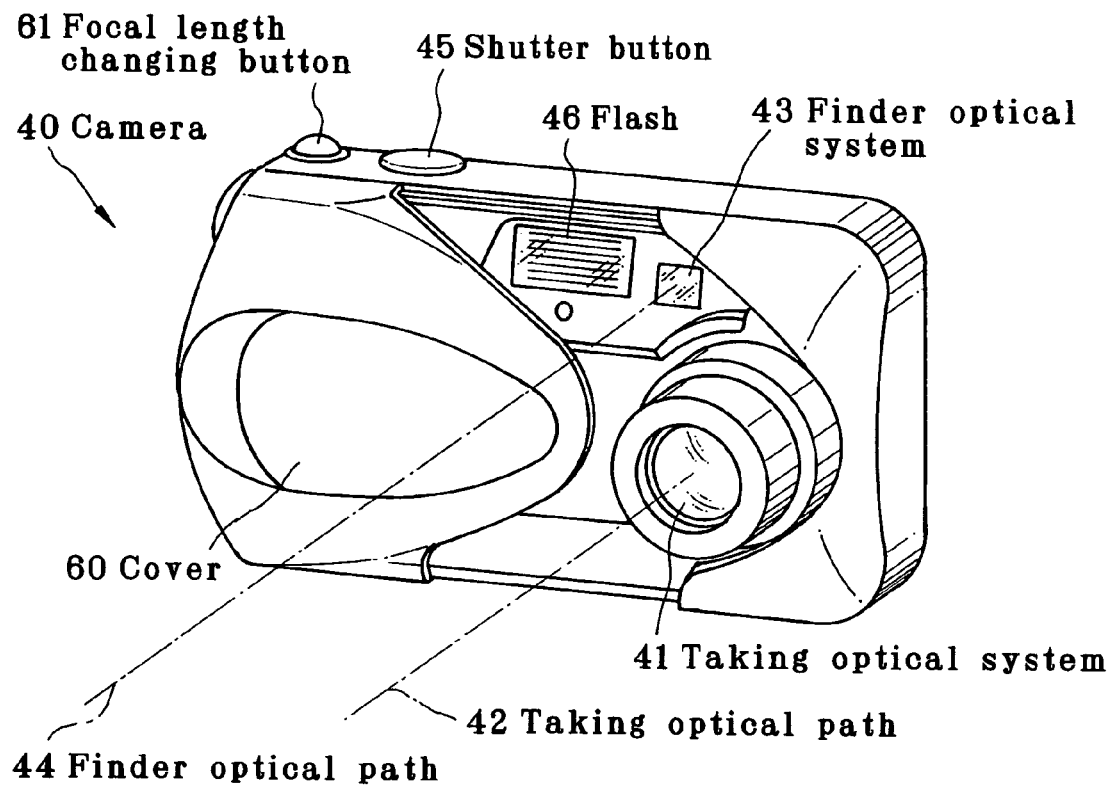
FIG. 17 is a front perspective view illustrative of the outside configuration of a digital camera according to the invention.
Figure 18:
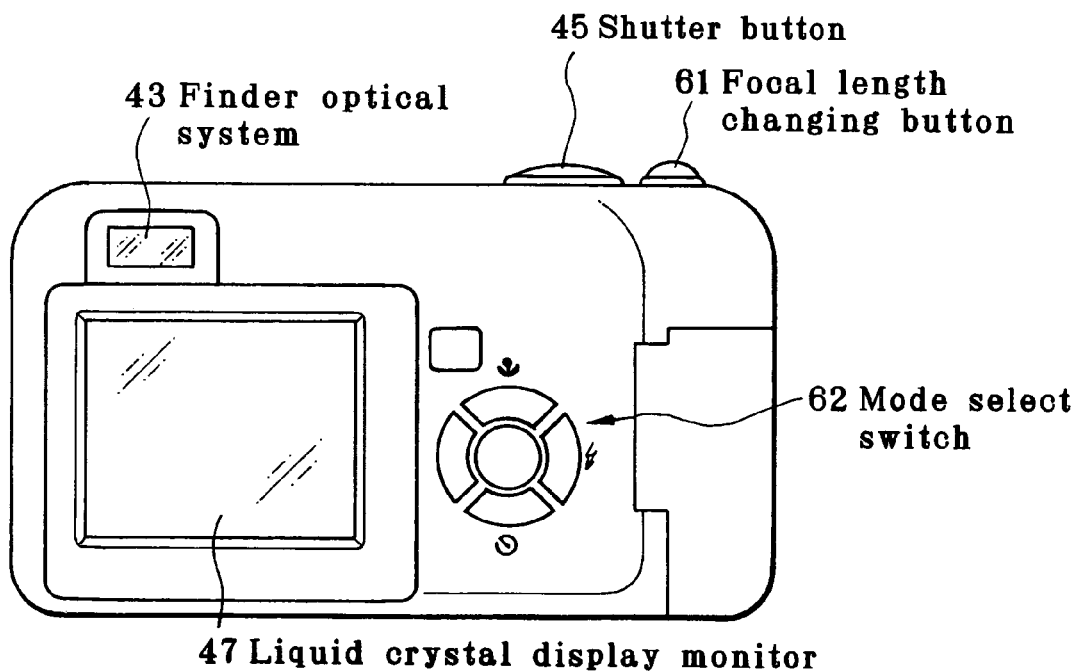
FIG. 18 is a rear perspective view of the digital camera of FIG. 17.

FIGS. 17, 18 and 19 are illustrative in conception of the construction of one digital camera according to the invention, in which a typical one of such zoom lenses as described above is built in a taking optical system 41. Specifically, FIG. 17 is a front perspective view of the outside configuration of a digital camera 40, FIG. 18 is a front view of the back side of the digital camera 40, and FIG. 19 is illustrative in schematic section of the construction of the digital camera. In this regard, note that FIGS. 17 and 19 are illustrative of the taking optical system during operation. In this embodiment, the digital camera 40 comprises a taking optical system 41 having a taking optical path 42, a finder optical system 43 having a finder optical path 44, a shutter button 45, a flash 46, a liquid crystal display monitor 47, a focal length change button 61, a mode select switch 62, and so on. When the taking optical system 41 is received at a collapsible lens mount, a cover 60 is slid back to cover the taking optical system 41, the finder optical system 43 and the flash 46. As the cover 60 is slid open to set the camera 40 in a taking mode, it causes the taking optical system 41 to get ready for operation, as shown in FIG. 19. As the shutter button 45 on the upper portion of the camera 40 is pressed down, it allows an image to be taken through the taking optical system 41, for instance, the zoom lens of Example 4. An object image formed through the taking optical system 41 is in turn formed on the imaging plane of CCD 49 via a low-pass filter F applied with a wavelength range-limiting coating and a cover glass C. The object image received at CCD 49 is displayed as an electronic image on the liquid crystal display monitor 47 mounted on the back side of the camera via processing means 51. Note that the processing means 51 could be connected with recording means 52 to record the taken electronic image in it. Also note that the recording means 52 could be provided separately from the processing means 51 or, alternatively, it could be operable to electronically record and write the image on a floppy disk, a memory card, an MO or the like. The camera 40 could also be designed in the form of a silver-halide camera with silver-halide film loaded in place of CCD 49.

In addition, on the finder optical path 44 there is a finder objective optical system 53 that is a zoom optical system comprising a plurality of lens units (three in FIGS. 17-19) and two prisms, and operable to change in focal length in association with the zoom lens in the taking optical system 41. An object image formed through the finder objective optical system 53 is in turn formed on the field frame 57 of an erection prism 55 that is an image erecting member. In the rear of the erection prism 55, there is located an eyepiece optical system 59 for guiding an erected image into the eyeball E of a viewer. Note that a cover member 50 is provided on the exit side of the eyepiece optical system 59.

With the thus assembled digital camera 40, high performance, compactness and a wide-angle arrangement are achievable, because the taking optical system 41 according to the invention is much more reduced in thickness upon received at a collapsible lens mount and has a high zoom ratio and far more stable image-formation capability all over the zoom range.

What we claim is:

1. A zoom lens comprising, in order from an object side to an image side thereof,
a first lens unit having negative refracting power,
a second lens unit having positive refracting power, and
a third lens unit having positive refracting power, with a space between adjacent lens units varied for zooming, wherein:
the first lens unit consists of one positive lens and one negative lens,
the second lens unit consists of two positive lenses and one negative lens, and
the third lens unit consists of one positive lens, and satisfies the following condition:

$$0.5<(R_1-R_2)/(R_1+R_2)<0.95 \qquad (1)$$

where $R_1$ is an axial radius of curvature of an object-side surface of the positive lens in the third lens unit, and $R_2$ is an axial radius of curvature of an image-side surface of the positive lens in the third lens unit,
wherein the first lens unit is located in the most object side in all lens units included in the zoom lens.

2. The zoom lens according to claim 1, wherein: the positive lens in the third lens unit is a plastic lens.

3. The zoom lens according to claim 1, which satisfies the following condition:

$$D_2/D_1<1.5 \qquad (3)$$

where $D_1$ is an axial thickness of the lens located in, and nearest to the object side of, the first lens unit, and $D_2$ is an axial air separation between a first lens and a second lens in the first lens unit.

4. The zoom lens according to claim 1, wherein: the zoom lens comprises a stop that is located on an object side of the second lens unit and operable to move in unison with the second lens unit.

5. An imaging system, comprising the zoom lens according to claim 1.

6. The zoom lens according to claim 1, wherein:
a total number of lens units in the zoom lens is three.

7. The zoom lens according to claim 6, wherein:
the first lens unit consists of, in order from an object side thereof, a meniscus lens convex on an object side thereof and having negative refracting power and a positive lens,
the second lens unit consists of, in order from an object side thereof, one positive lens and a cemented doublet wherein the cemented doublet consists of a double-convex lens and a double-concave lens, and
the third lens unit consists of one meniscus lens having positive refracting power.

8. The zoom lens according to claim 7, wherein:
an image-side surface of the meniscus lens of negative refracting power in the first lens unit, and an image-side surface of the meniscus lens of positive refracting power in the third lens unit are each an aspheric surface.

9. The zoom lens according to claim 7, wherein:
the double-convex lens in the cemented doublet in the second lens unit satisfies the following condition:

$$|(R_3+R_4)/(R_3-R_4)|<0.1 \qquad (2)$$

where $R_3$ is an axial radius of curvature of an object-side surface of the double-convex lens in the cemented doublet in the second lens unit, and $R_4$ is an axial radius of curvature of an image-side surface of the double-convex lens in the cemented doublet in the second lens unit.

10. The zoom lens according to claim 7, wherein:
absolute values of curvatures the object-side and image-side surfaces of the double-convex lens in the cemented doublet in the third lens unit are equal.

11. The zoom lens according to claim 6, wherein:
the positive lens in the third lens unit is a plastic lens.

12. The zoom lens according to claim 6, which satisfies the following condition:

$$D_2/D_1<1.5 \qquad (3)$$

where $D_1$ is an axial thickness of the lens located in, and nearest to the object side of, the first lens unit, and $D_2$ is an axial air separation between a first lens and a second lens in the first lens unit.

13. The zoom lens according to claim 6, wherein:
an object-side surface and an image-side surface of the positive lens located in, and nearest to the object side of, the second lens unit, are each an aspheric surface.

14. The zoom lens according to claim 6, wherein:
the zoom lens comprises a stop that is located on an object side of the second lens unit and operable to move in unison with the second lens unit.

15. An imaging system, comprising the zoom lens according to claim 6.

16. A zoom lens comprising, in order from an object side to an image side thereof,
a first lens unit having negative refracting power,
a second lens unit having positive refracting power, and
a third lens unit having positive refracting power, with a space between adjacent lens units varied for zooming, wherein:
the first lens unit consists of one positive lens and one negative lens,
the second lens unit consists of two positive lenses and one negative lens, and
the third lens unit consists of one positive lens, and satisfies the following condition:

$$0.5<(R_1-R_2)/(R_1+R_2)<0.95 \qquad (1)$$

where $R_1$ is an axial radius of curvature of an object-side surface of the positive lens in the third lens unit, and $R_2$ is an axial radius of curvature of an image-side surface of the positive lens in the third lens unit, and wherein
the first lens unit consists of, in order from an object side thereof, a meniscus lens convex on an object side thereof and having negative refracting power and a positive lens,
the second lens unit consists of, in order from an object side thereof, one positive lens and a cemented doublet wherein the cemented doublet consists of a double-convex lens and a double-concave lens, and
the third lens unit consists of one meniscus lens having positive refracting power.

17. The zoom lens according to claim 16, wherein:
an image-side surface of the meniscus lens of negative refracting power in the first lens unit, and an image-side surface of the meniscus lens of positive refracting power in the third lens unit are each an aspheric surface.

18. The zoom lens according to claim 16, wherein:
the double-convex lens in the cemented doublet in the second lens unit satisfies the following condition:

$$|(R_3+R_4)/(R_3-R_4)|<0.1 \qquad (2)$$

where $R_3$ is an axial radius of curvature of an object-side surface of the double-convex lens in the cemented doublet in the second lens unit, and $R_4$ is an axial radius of curvature of an image-side surface of the double-convex lens in the cemented doublet in the second lens unit.

19. The zoom lens according to claim 16, wherein: absolute values of curvatures the object-side and image-side surfaces of the double-convex lens in the cemented doublet in the third lens unit are equal.

20. A zoom lens comprising, in order from an object side to an image side thereof,
a first lens unit having negative refracting power,
a second lens unit having positive refracting power, and
a third lens unit having positive refracting power, with a space between adjacent lens units varied for zooming, wherein:
the first lens unit consists of one positive lens and one negative lens,
the second lens unit consists of two positive lenses and one negative lens, and
the third lens unit consists of one positive lens, and satisfies the following condition:

$$0.5 < (R_1 - R_2)/(R_1 + R_2) < 0.95 \tag{1}$$

where $R_1$ is an axial radius of curvature of an object-side surface of the positive lens in the third lens unit, and $R_2$ is an axial radius of curvature of an image-side surface of the positive lens in the third lens unit, and wherein
an object-side surface and an image-side surface of the positive lens located in, and nearest to the object side of, the second lens unit, are each an aspheric surface.

* * * * *